United States Patent
Hirata et al.

(10) Patent No.: US 8,755,255 B2
(45) Date of Patent: Jun. 17, 2014

(54) NEAR-FIELD LIGHT GENERATING ELEMENT, METHOD OF MANUFACTURING NEAR-FIELD LIGHT GENERATING ELEMENT, NEAR-FIELD LIGHT HEAD, METHOD OF MANUFACTURING NEAR-FIELD LIGHT HEAD, AND INFORMATION RECORDING AND PLAYBACK DEVICE

(75) Inventors: Masakazu Hirata, Chiba (JP); Manabu Oumi, Chiba (JP)

(73) Assignee: Seiko Instruments Inc. (JP)

( * ) Notice: Subject to any disclaimer, the term of this patent is extended or adjusted under 35 U.S.C. 154(b) by 133 days.

(21) Appl. No.: 13/199,954

(22) Filed: Sep. 13, 2011

(65) Prior Publication Data
US 2012/0063277 A1    Mar. 15, 2012

(30) Foreign Application Priority Data

Sep. 14, 2010   (JP) ................................. 2010-205975
Jul. 5, 2011    (JP) ................................. 2011-149177

(51) Int. Cl.
*G11B 11/00*    (2006.01)
(52) U.S. Cl.
USPC .................. 369/13.33; 369/13.13; 369/13.17
(58) Field of Classification Search
USPC .................. 369/13.13, 13.33, 13.32, 112.09, 369/112.14, 112.21, 112.27; 360/59; 385/129, 31, 88–94; 250/201.3, 201.5
See application file for complete search history.

(56) References Cited

U.S. PATENT DOCUMENTS

| 6,687,196 | B1 * | 2/2004 | Ueyanagi .................. 369/13.33 |
| 2009/0168220 | A1 * | 7/2009 | Komura et al. ................. 360/59 |
| 2010/0157745 | A1 * | 6/2010 | Okada et al. ................ 369/13.02 |
| 2012/0082016 | A1 * | 4/2012 | Komura et al. ............ 369/13.33 |
| 2012/0279051 | A1 * | 11/2012 | Zhou et al. ................. 29/603.07 |

FOREIGN PATENT DOCUMENTS

| JP | 2002006162 |   | 1/2002 |             |
| JP | 2002006162 | A * | 1/2002 | ............ G02B 6/122 |
| JP | 2008152897 |   | 7/2008 |             |

* cited by examiner

*Primary Examiner* — Wayne Young
*Assistant Examiner* — Dionne Pendleton
(74) *Attorney, Agent, or Firm* — Adams & Wilks

(57) ABSTRACT

A method of manufacturing a near-field light generating element includes a first cladding forming process of forming a first cladding on a substrate, a near-field light generation portion forming process of forming a metal film base material on the first cladding, a core forming process of forming a core base material so as to cover the metal film base material, a single patterning process of collectively patterning the core base material and the metal film base material to form the core and the metal film, respectively, and a second cladding forming process of forming a second cladding so as to interpose the core between the second cladding and the first cladding.

10 Claims, 14 Drawing Sheets

NEAR-FIELD LIGHT GENERATING ELEMENT, METHOD OF MANUFACTURING NEAR-FIELD LIGHT GENERATING ELEMENT, NEAR-FIELD LIGHT HEAD, METHOD OF MANUFACTURING NEAR-FIELD LIGHT HEAD, AND INFORMATION RECORDING AND PLAYBACK DEVICE

BACKGROUND OF THE INVENTION

1. Field of the Invention

The present invention relates to a near-field light generating element that records and plays a variety of information on a magnetic recording medium using a near-field light with focused light flux, a method of manufacturing a near-field light generating element, a near-field light head, a method of manufacturing a near-field light head, and an information recording and playback device.

2. Background Art

In recent years, along with an increase in the capacity of a hard disk or the like in computer equipment, the recording density of information in a single recording surface has increased. For example, in order to increase the recording capacity of a magnetic disk per unit area, there is a need to increase a surface recording density. Incidentally, as the recording density increases, a recording area occupied per bit on the recording medium is reduced. When the bit size is reduced, energy held by one bit of information comes close to the heat energy of room temperature, whereby there is a problem of thermal demagnetization in which the recorded information is reversed or disappears owing to thermal fluctuations or the like.

The in-plane recording method generally used is a method of recording the magnetism so that a direction of magnetization faces the in-plane direction of the recording medium. However, in this method, the recording information is easily lost due to the demagnetization mentioned above. Thus, in order to solve this problem, in recent years, a perpendicular recording method is adopted in which a magnetization signal is recorded in a direction perpendicular to the recording medium. This method is to record the magnetic information using the principle of causing a single magnetic pole to approach the recording medium. According to this method, the recording magnetic field faces a direction that is substantially perpendicular to a recording film. Since it is difficult for the N-pole and S-pole to form a loop within the recording film surface, information recorded in the vertical magnetic field easily maintains energetic stability. For that reason, the perpendicular recording method becomes resistant to the thermal demagnetization compared to the in-plane recording method.

However, recent recording have required a further increase in high density in response to the needs for performing the recording and playback of larger amounts and higher densities of information, or the like. For that reason, in order to suppress the influence between the adjacent magnetic domains or the thermal fluctuations to a minimum, a recording medium having strong coercive force has been adopted. For that reason, even with the perpendicular recording method mentioned above, it is difficult to record information on the recording medium.

Thus, in order to solve the disadvantage mentioned above, a hybrid magnetic recording type recording and playback head is provided in which the magnetic domain is locally heated using a spot light with the focused light or the near-field light to temporarily lower the coercive force, thereby performing the writing onto the recording medium in the meanwhile.

Among such recording and playback heads, a recording and playback head (hereinafter, referred to as near-field light head) using the near-field light mainly includes a slider, a recording element having a main magnetic pole and a return pole that are placed on the slider, a near-field light generating element that generates the near-field light from the radiate laser light, a laser light source that radiates laser light toward the near-field light generating element, and an optical waveguide that guides laser light generated from the laser light source to the near-field light generating element (for example, JP-A-2008-152897). The near-field light generating element has a core that propagates laser light while reflecting the same, a light flux propagation element having a cladding that comes into close contact with the core and seals the core, and a metal film that is placed between the core and the cladding to generate the near-field light from the laser light. The core is drawn so that the cross-sectional area perpendicular to the propagation direction of laser light facing from one end side (light incident side) to the other end side (light leaking side) is gradually reduced, and is configured so as to propagate the laser light toward the other end side while focusing the same. Moreover, the metal film mentioned above is placed on a side surface of the other end side in the core.

In the case of using the near-field light head configured in this manner, a variety of information is recorded on the recording medium by generating the near-field light and applying the recording magnetic field. That is, laser light emitted from the laser light source is incident to the light flux propagation element via the optical waveguide. Moreover, laser light incident to the light flux propagation element is distributed through the cores and reaches the metal film. Then, since free electron within the metal film is uniformly vibrated by laser light, plasmon is excited and generates the near-field light on the other end side of the core in the state of being localized. As a result, the magnetic recording layer of the magnetic recording medium is locally heated by the near-field light and coercive force is temporarily lowered.

Furthermore, by providing the driving electric current to the recording element simultaneously with the radiation of the laser light mentioned above, the recording magnetic field is locally applied to the magnetic recording layer of the magnetic recording medium adjacent to the tip of the main magnetic pole. As a result, it is possible to record a variety of information on the magnetic recording layer in which the coercive force is temporarily lowered. That is, by the cooperation of the near-field light with magnetic field, the recording to the magnetic recording medium can be performed.

Incidentally, in order to manufacture the light flux propagation element mentioned above, for example, a method shown in Japanese Patent No. 3820849 is known. Specifically, firstly, an under cladding is formed on a side surface of a substrate, and a core having a cross section of a rectangular shape is formed on the under-cladding. After that, the core is subjected to the sputter etching in plasma to form the core having a cross section of a triangular shape, and the over-cladding is deposited thereon.

Moreover, in order to form a metal film on the side surface of the core using this method, a method is considered in which, after patterning the metal film on the under-cladding, the core and the over-cladding are formed by the same method as Japanese Patent No. 3820849 mentioned above.

However, since the metal film and the core have very minute patterns (the respective sizes are about tens of nm), there is a problem in that the respective positionings are difficult. Moreover, when the positions of the metal film and the core are misaligned from each other, laser light propagated through the core is not incident to the metal film but leaks out of the core, whereby there is a problem in that the generation efficiency of the near-field light declines.

SUMMARY OF THE INVENTION

Thus, the present invention was made in view of such a situation, and an object thereof is to provide a near-field light generating element which can precisely position the near-field light generating portion and the core to improve the generation efficiency of the near-field light, a method of manufacturing the near-field light generating element, a near-field light head, a method of manufacturing the near-field light head, and an information recording and playback device.

The present invention provides means as below so as to solve the problems mentioned above.

According to the present invention, there is provided a near-field light generating element which propagates the light flux introduced to one end side while focusing the light flux toward the other end side, and emits the light flux to the outside after creating the light flux to the near-field light, the element having a core that propagates the light flux toward the other end side; and a near-field light generating portion which is placed along a propagation direction of the light flux facing from the one end side toward the other end side in the core to propagate the light flux along an interface between the near-field light generating portion and the core, and generates the near-field light from the light flux, wherein the core includes a plurality of side surfaces extended along the propagation direction, the plurality of side surfaces has one side surface with the near-field light generating element placed thereon, and the other side surface that is placed along a direction intersecting a plane direction of the one side surface on both sides of the one side surface when viewed from the propagation direction, and both end surfaces of the near-field light generating portion are placed on the same surface of the other side surface of the core when viewed from the propagation direction.

According to this configuration, since the cores and the near-field light generating portion are placed so as to overlap with each other when viewed from a direction perpendicular to the propagation direction, light flux propagated to the other end side of the core can be fully incident to the near-field light generating portion. Thus, the generation efficiency of the near-field light can be improved.

Furthermore, according to the present invention, there is provided a method of manufacturing the near-field light generating element which propagates the light flux introduced to one end side while focusing the light flux toward the other end side, and emits the light flux to the outside after creating the light flux to the near-field light, the element having a core that propagates the light flux toward the other end side; and a near-field light generating portion which is placed along the propagation direction of the light flux facing from the one end side toward the other end side in the core to propagate the light flux along the interface between the near-field light generating portion and the core, and generates the near-field light from the light flux, the method including a near-field light generating portion forming process of forming a base material of the near-field light generating portion; a core forming process of forming a base material of the core so as to cover the near-field light generating portion; and a patterning process of patterning the base material of the core and the base material of the near-field light generating portion to form the core and the near-field light generating portion, wherein, in the patterning process, the base material of the core and the base material of the near-field light generating portion are collectively patterned by the same process.

According to this configuration, by collectively patterning the core and the near-field light generating portion by the same patterning process, the other side surface of the core and both end surfaces of the near-field light generating portion are placed on the same surface when viewed from the propagation direction. That is, the core and the near-field light generating portion are formed so as to overlap with each other when viewed from the direction orthogonal to the propagation direction.

As a result, for example, unlike a case where the core and the near-field light generating portion are patterned by the separate processes, respectively, the near-field light generating portion and the core can be accurately positioned. Thus, since light flux propagated to the other end side of the core can be fully incident to the near-field light generating portion, the generation efficiency of the near-field light can be improved.

Furthermore, before the near-field light generating portion forming process, a first light shielding film forming process is included which forms a first light shielding film at least in a forming region of the near-field light generating portion, and in the patterning process, the first light shielding film is collectively patterned together with the base material of the core and the base material of the near-field light generating portion.

According to this configuration, the Plasmon resonance is not caused in the near-field light generating portion, but light flux transmitted through the near-field light generating portion is reflected to the first light shielding film and returns into the core, whereby light flux can be incident to the near-field light generating portion again. As a result, the generation efficiency of the near-field light can be further improved.

Furthermore, by collectively patterning the first light shielding film and the core by the same patterning process, the first light shielding film and the core can be accurately positioned. As a result, light flux transmitted through the near-field light generating portion can fully return into the core.

Furthermore, after the patterning process, a second light shielding film forming process is included which forms a second light shielding film so as to cover the core.

In this configuration, by forming the light shielding film so as to cover the core, light flux incident to the core is propagated toward the other end side while being reflected by an interface between the second light shielding film and the core without leaking to the outside. As a result, light flux can be effectively incident to the near-field light generating portion, which can further improve the generation efficiency of the near-field light.

Furthermore, the patterning process has a first patterning process and a second patterning process, in the first patterning process, the base material of the core in the forming region of the core is patterned so as to be a rectangular shape when viewed from the propagation direction, and in the second patterning process, the base material of the core is subjected to the sputter etching in plasma, thereby patterning the base material of the core so as to become a triangular shape or a trapezoidal shape when viewed from the propagation direction.

In this configuration, by performing the sputter etching of the base material of the core formed in the rectangular shape in the first patterning process, the corner portion of the base material of the core is selectively etched and a sloped surface is formed. Moreover, when the etching is further continued in this state, the sloped surface is etched while maintaining a given angle with respect to the bottom surface. As a result, it is possible to form the core at any width or height when viewed from the propagation direction.

Furthermore, in the second pattering process, the base material of the near-field light generating portion and the base material of the core are subjected to the sputter etching.

In this configuration, when the sputter etching is continued after the sputter etching of the base material of the core, the base material of the core is etched while maintaining the similar shape, and the base material of the metal film is etched. As s result, the other side surface of the core and both end surfaces of the near-field light generating portion are placed on the same surface when viewed from the propagation direction. That is, the cores and the near-field light generating portion are formed so as to overlap with each other when viewed from a direction perpendicular to the propagation direction.

Furthermore, in the first patterning process, the base material of the core other than the forming region of the core remains in the state of being thinner than the base material of the core in the forming region of the core.

According to this configuration, in the first patterning process, the base material of the core remains other than the forming region of the core, whereby, when etching the near-field light generating portion in the second patterning process, it is possible to prevent a film (for example, a first cladding) lower than the near-field light generating portion being overetched.

Furthermore, the near-field light generating portion is formed of a metallic material, and between the near-field light generating portion forming process and the core forming process, a process of removing the base material of the near-field light generating portion at least formed on the one end side is included.

In this configuration, by removing the base material of the near-field light generating portion between the near-field light generating portion forming process and the core forming process, it is possible to cause the core and a film (for example, the first cladding) having the adherence to the core higher than the metallic material to come into close contact with each other. As a result, the film peeling can be suppressed during manufacturing.

Furthermore, after the patterning process, a polishing process of polishing the other end surface of the core is included, and in the polishing process, an ELG element is formed on the substrate formed with the core so as to be flush with the other end surface of the core, and the other end surface and the ELG element are polished while monitoring the resistance value of the ELG element.

According to this configuration, by using the ELG in the polishing process, the end surface of the other end side of the core can be accurately positioned. As a result, the near-field light can be more effectively generated.

Furthermore, according to the present invention, there is provided a method of manufacturing a near-field light head which heats a magnetic recording medium rotating in a given direction using the method of manufacturing the near-field light generating element of the present invention and causes a magnetization reversal by applying recording magnetic field to the magnetic recording medium to record information, the method include a magnetic pole forming process of forming a base material of the magnetic pole generating the recording magnetic field before the near-field light generating portion forming process, and in the patterning process, the base material of the magnetic pole is collectively patterned by the same process together with the base material of the core and the base material of the near-field light generating portion.

According to this configuration, by collectively patterning the base material of the magnetic pole by the same patterning process together with the base material of the core and the base material of the near-field light generating portion, the other side surface of the core, both end surfaces of the near-field light generating portion, and the external end surface of the magnetic pole are placed on the same surface when viewed from the propagation direction. As a result, for example, unlike a case where the core, the near-field light generating portion, and the magnetic pole are patterned by separate processes, respectively, it is possible to accurately position the near-field light generating portion, the core, and the magnetic pole. In addition, since the core, the near-field light generating portion, and the magnetic pole can be positioned without the use of an expensive positioning device, the cost of the device can be reduced.

In this case, the magnetic pole is formed so as to cover the near-field light generating portion from the opposite side of the core with the near-field light generating element interposed therebetween. For that reason, it is possible to accurately position the generation position of the near-field light and the generation position of the magnetic field from the magnetic pole, whereby the reliability of the writing of the near-field light head itself can be raised to promote increased quality.

Furthermore, even in a case where Plasmon resonance is not generated in the near-field light generating portion but the light flux is transmitted through the near-field light generating portion, the light flux can be incident to the near-field light generating portion again by reflecting the light flux to the magnetic pole to return into the core. As a result, the generation efficiency of the near-field light can be further improved. In addition, since it is possible to suppress that the light flux leaks to the outside without generating the Plasmon resonance in the near-field light generating portion, the spot of the extremely small near-field light can be created only in the vicinity of the core.

Furthermore, according to the present invention, there is provided a near-field light head which heats a magnetic recording medium rotating in a given direction and causes the magnetization reversal by applying the recording magnetic field to the magnetic recording medium to record information, the near-field light head includes a slider that is oppositely placed on a surface of the magnetic recording medium; a recording element that is placed on a tip side of the slider and has a magnetic pole generating the recording magnetic field; the near-field light generating element of the present invention that is fixed adjacent to the recording element in the state where the other end side faces the magnetic recording medium side; and light flux introduction means that is fixed to the slider and introduces the light flux from the one end side into the core.

According to this configuration, since the near-field light generating element of the present invention is included, the reliability of the near-field light head itself can be enhanced, which can promote increased quality.

Furthermore, the magnetic pole is oppositely placed on the one side surface of the core with the near-field light generating portion interposed therebetween, and the external end surface of the magnetic pole is placed on the same surface of the other side surface of the core when viewed from the propagation direction.

According to this configuration, since the magnetic pole is formed so as to cover the near-field light generating portion from the opposite side of the core with the near-field light generating element interposed therebetween, it is possible to accurately position the generation position of the near-field light and the generation position of the magnetic field, whereby the reliability of the writing of the near-field light head itself can be enhanced to promote increased quality.

Furthermore, even in a case where Plasmon resonance is not generated in the near-field light generating portion but the light flux is transmitted through the near-field light generating portion, the light flux can be incident to the near-field light generating portion again by reflecting the light flux to the magnetic pole to return into the core. As a result, the generation efficiency of the near-field light can be further improved. In addition, since it is possible to suppress that the light flux leaks to the outside without generating the Plasmon resonance in the near-field light generating portion, the spot of the extremely small near-field light can be created only in the vicinity of the core.

Furthermore, between the near-field light generating portion and the magnetic pole, a separation film is formed which forms an image between the near-field light generating portion and the magnetic pole.

According to this configuration, when the near-field light generating portion and the magnetic pole are formed of a metallic material having conductivity, the near-field light generating portion and the magnetic pole can be electrically insulated, and the alloying of the near-field light generating portion can be suppressed. Thus, the movement of the free electron in the near-field light generating portion is not adversely affected. For that reason, the generation efficiency of the near-field light can be further improved.

Furthermore, according to the present invention, there is provided an information recording and playback device which includes the near-field light head of the present invention; a beam that is movable in a direction parallel to the surface of the magnetic recording medium and supports the near-field light head on a tip side in the state of being rotatable around two axes which are parallel to the surface of the magnetic recording medium and are perpendicular to each other; a light source that causes the light flux to be incident to the light flux introduction means; an actuator that supports a proximal end side of the beam and moves the beam toward a direction parallel to the surface of the magnetic recording medium; a rotation driving portion that rotates the magnetic recording medium in the given direction; and a control portion that controls the operation of the recording element and the light source.

According to this configuration, since the near-field light head of the present invention is included, the reliability of the writing can be enhanced, which can promote increased quality.

According to the near-field light generating element according to the present invention and the method of manufacturing the same, it is possible to accurately position the near-field light generating portion and the core and improve the generation efficiency of the near-field light.

According to the near-field light head and the information recording and playback device according to the present invention, the reliability of the writing is high and it is possible to cope with the recording of high quality, whereby increased quality can be promoted.

DETAILED DESCRIPTION OF THE INVENTION

Next, an embodiment of the present invention will be described based on the drawings.

Figure 2:
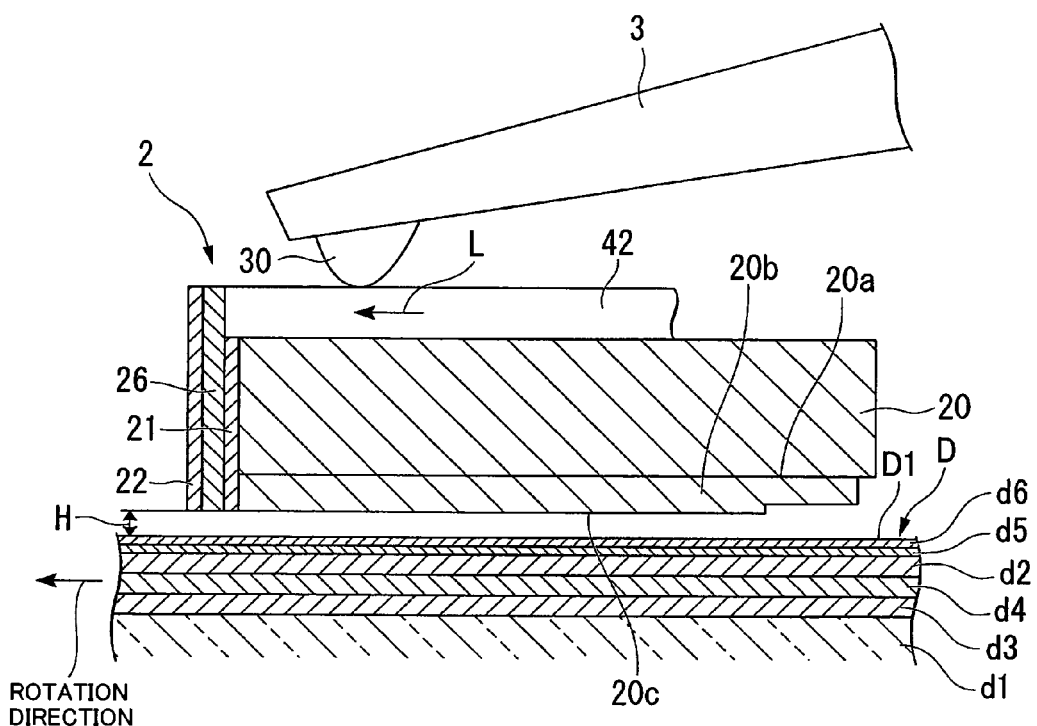
FIG. 2 is an enlarged cross-sectional view of a recording and playback head.
Figure 2:
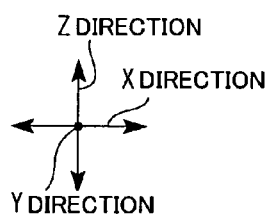

In addition, an information recording and playback device 1 of the present embodiment is a device that performs the recording and playback on a disc D by a hybrid magnetic recording method in which a near-field light R cooperates with recording magnetic field with a disc D (a magnetic recording medium) having a perpendicular recording layer d2 (see FIG. 2).

First Embodiment

Information Recording and Playback Device

Figure 1:
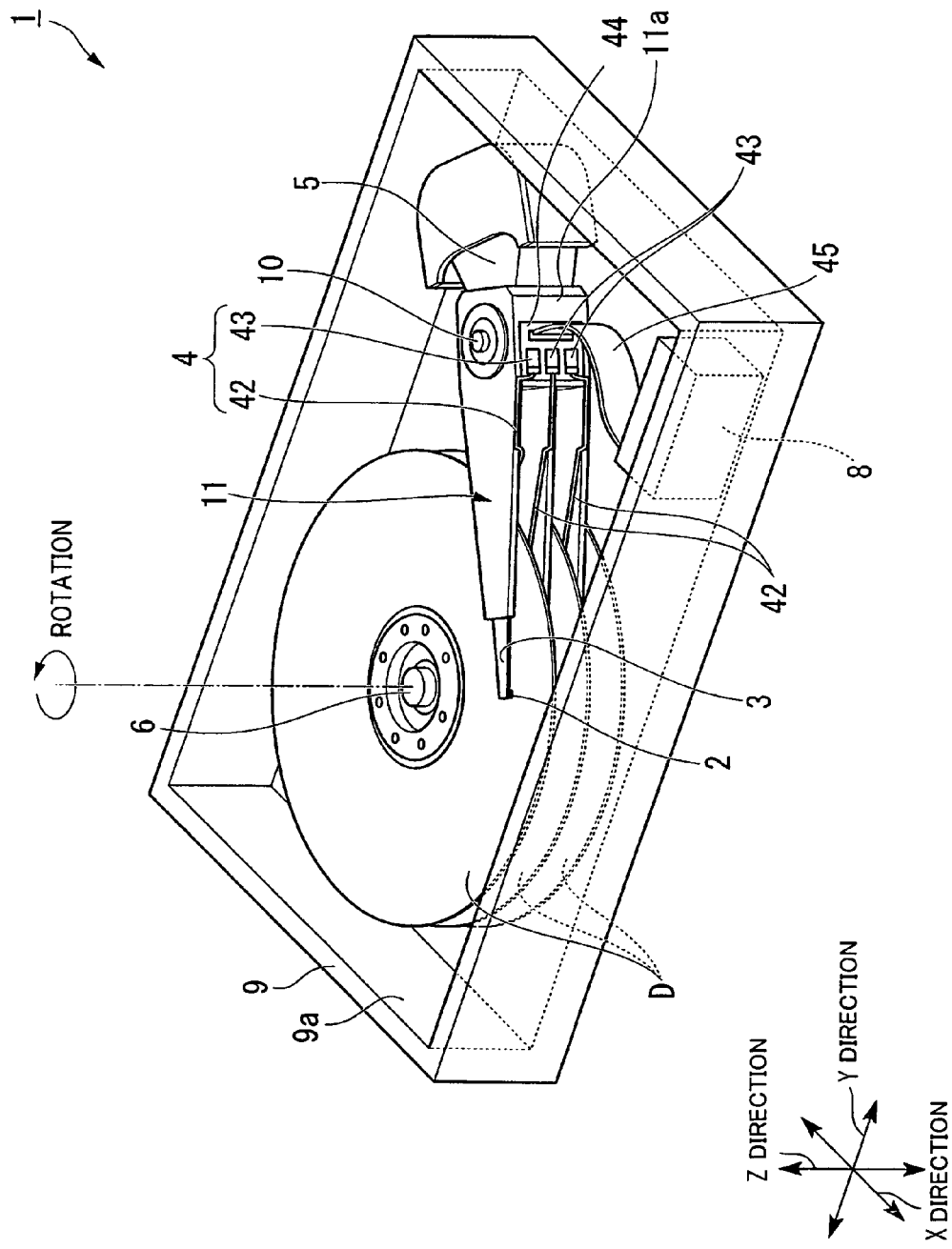
FIG. 1 is a configuration diagram of an information recording and playback device in an embodiment of the present invention.

FIG. 1 is a configuration diagram of an information recording and playback device.

As shown in FIG. 1, the information recording and playback device 1 of the present embodiment includes a recording and playback head (a near-field light head) 2, a beam 3 that supports the recording and playback head 2, a light flux incident mechanism 4 that makes laser light (light flux) L (see FIG. 2) incident to the recording and playback head 2, an actuator 5 that moves the beam 3, a spindle motor (a rotation driving portion) 6 that rotates the disc D in a given direction, a control portion 8 that collectively controls the respective components mentioned above, and a housing 9 that accommodates the respective components in an inner portion.

The housing 9 is formed of a metal material such as aluminum in a rectangular shape when viewed from an upper surface, and the inside thereof is formed with a concave portion 9a that accommodates the respective components.

Furthermore, a lid (not shown) is fixed to the housing 9 in an attachable and detachable manner so as to close the opening of the concave portion 9a. A spindle motor 6 is attached to an approximately center of the concave portion 9a, whereby the disc D is fixed in a freely attachable and detachable manner by engaging with the center hole in the spindle motor 6. In addition, in the present embodiment, a case is described as an example where three discs D are fixed to the spindle motor 6. However, the number of the disc D is not limited to three.

The actuator 5 is attached to the corner portion of the concave portion 9a. A carriage 11 is attached to the actuator 5 via a bearing 10. The carriage 11 is formed of a metal material, for example, through the cutting, and has a three-layer structure so that a portion facing from a proximal end portion 11a to a tip to be fixed to the actuator 5 via the bearing 10 is placed on an upper surface of the three disc D. That is, when being viewed from the side surface, the carriage 11 is formed so as to become an E shape. Moreover, the proximal end side of the beam 3 is fixed to each tip of the carriage 11 divided into three layers. Thus, the actuator 5 supports the proximal end side of the beam 3 via the carriage 11, whereby the beam 3 can be scanned and moved toward an XY direction parallel to a disc surface (a surface of the magnetic recording medium) D1 (see FIG. 2).

As mentioned above, the beam 3 can be moved in the XY direction together with the carriage 11 by the actuator 5 and supports the recording and playback head 2 on the tip side thereof in the state of being rotatable around two axes (X axis and Y axis) that are parallel to the disc surface D1 and are perpendicular to each other. In addition, the beam 3 and the carriage 11 are adapted to be retreated from the upper portion of the disc D by the driving of the actuator 5 when the rotation of the disc D is stopped.

(Recording and Playback Head)

Figure 3:
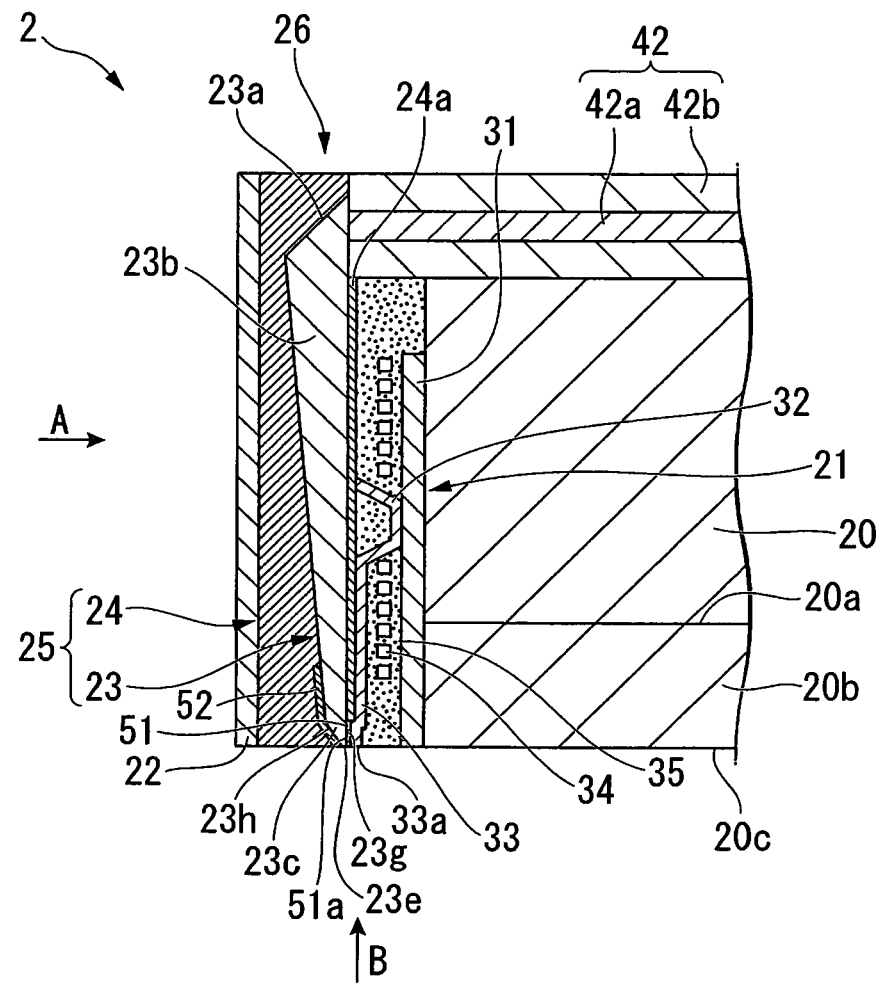
FIG. 3 is an enlarged cross-sectional view of a side surface of an outflow end side of the recording and playback head.
Figure 3:
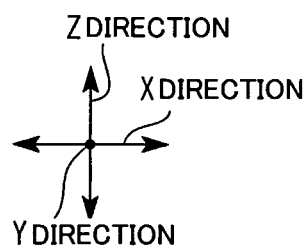

FIG. 2 is an enlarged cross-sectional view of the recording and playback head, and FIG. 3 is an enlarged cross-sectional view of a side surface of an outflow end side of the recording and playback head.

As shown in FIGS. 2 and 3, the recording and playback head 2 is a head that records and plays a variety of information on the rotating disc D using the near-field light R created from the laser light L. The recording and playback head 2 includes a slide 20 that is placed opposite to the disc D in the state of floating from the disk surface D1 by a predetermined distance H, a recording element 21 that records information on the disc D, a playback element 22 that plays information recoded on the disc D, and a near-field light generating element 26 that propagates the introduced laser light L while focusing the same and emits the laser light outside after creating the near-field light R.

The slider 20 is formed of a light transmitting material such as quartz glass, ceramic such as AlTiC (altic) or the like in a rectangular shape. The slider 20 has an opposite surface 20a facing the disc D, and is supported so as to hung on the tip of the beam 3 via a gimbal portion 30 (see FIG. 2). The gimbal portion 30 is a component in which the movement is restricted so as to be displaced only around the X axis and the Y axis. As a result, the slider 20 is freely rotated around two axes (the X axis and the Y axis) that are parallel to the disc surface D1 and perpendicular to each other as mentioned above.

Furthermore, on the opposite surface 20a, a convex portion 20b is formed which generates pressure for floating from viscosity of an air flow generated by the rotating disc D. The convex portion 20b is formed so as to be extended along a longitudinal direction (the X direction), and two convex portions 20b are formed in a left and right (the Y direction) direction so as to be arranged in a rail shape at intervals. However, the convex portion 20b is not limited to this case, but may be any irregularity if one is designed so that a positive pressure trying to separate the slider 20 from the disc surface D1 and a negative pressure trying to attract the slider 20 to the disc surface D1 are adjusted and the slider 20 is caused to float in an optimal state. In addition, the surface of the convex portion 20b is called an ABS (AIR BEARING SURFACE) 20c.

Moreover, the slider 20 is subjected to force floating from the disc surface D1 by two convex portions 20b. Meanwhile, the beam 3 is bent in the Z direction perpendicular to the disc surface D1 to absorb the floating force of the slider 20. That is, the slider 20 is subjected to force that is pressed to the disc surface D1 side by the beam 3 upon floating. Thus, the slider 20 floats in the state of being separated from the disc surface D1 by a predetermined distance H as mentioned above by balance of both forces. In addition, since the slider 20 is adapted to rotate around the X axis and the Y axis by the gimbal portion 30, the slider 20 floats in the state in which the posture is always stable.

In addition, the air flow generated by the rotation of the disc D flows in from the inflow end side (the X direction proximal end side of the beam 3) of the slider 20, and then flows along the ABS 20c and is discharged from the outflow end side (the X direction tip side of the beam 3) of the slider 20.

As shown in FIG. 3, the recording element 21 is an element that causes recording magnetic field to act on the disc D to record information, and includes an return pole 31 that is fixed to the side surface (a tip surface) of the outflow end side of the slider 20, a main magnetic pole 33 that is connected to the return pole 31 via a magnetic circuit 32 and generates the recording magnetic field perpendicular to the disc D between the disc D and the return magnetic pole 31, and a coil 34 that is wound around the magnetic circuit 32 about the magnetic circuit 32 in a spiral shape. That is, the return pole 31, the magnetic circuit 32, the coil 34, and the main magnetic pole 33 are placed in an aligned state in order from the outflow end side of the slider 20.

Both magnetic poles 31 and 33 and the magnetic circuit 32 are formed of a high saturation magnetic flux density (Bs) material (for example, CoNiFe alloy, CoFe ally or the like) having a high magnetic flux density. Furthermore, the coil 34 is placed between the adjacent coil lines, between the magnetic circuits 32, and between both magnetic poles 31 and 33 at a gap, and is molded by an insulator 35 in this state. Moreover, the coil 34 is adapted so that electric current modulated depending on information is supplied from the control portion 8. That is, the magnetic circuit 32 and the coil 34 generally constitute an electromagnet. In addition, the main magnetic pole 33 and the return pole 31 are designed so that the end surface (the end surface of the Z direction) facing the disc D so as to be flushed with the ABS 20c of the slider 20. Furthermore, the tip portion 33a (the leaking side of the laser light L) of the main magnetic pole 33 is protruded from the insulator 35 toward the playback element 22 side and is buried within a first cladding 24a described later. In addition, the tip portion 33a of the main magnetic pole 33 may be formed of a material (a material having a high saturation magnetic flux density) differ from the proximal end portion.

Figure 4:
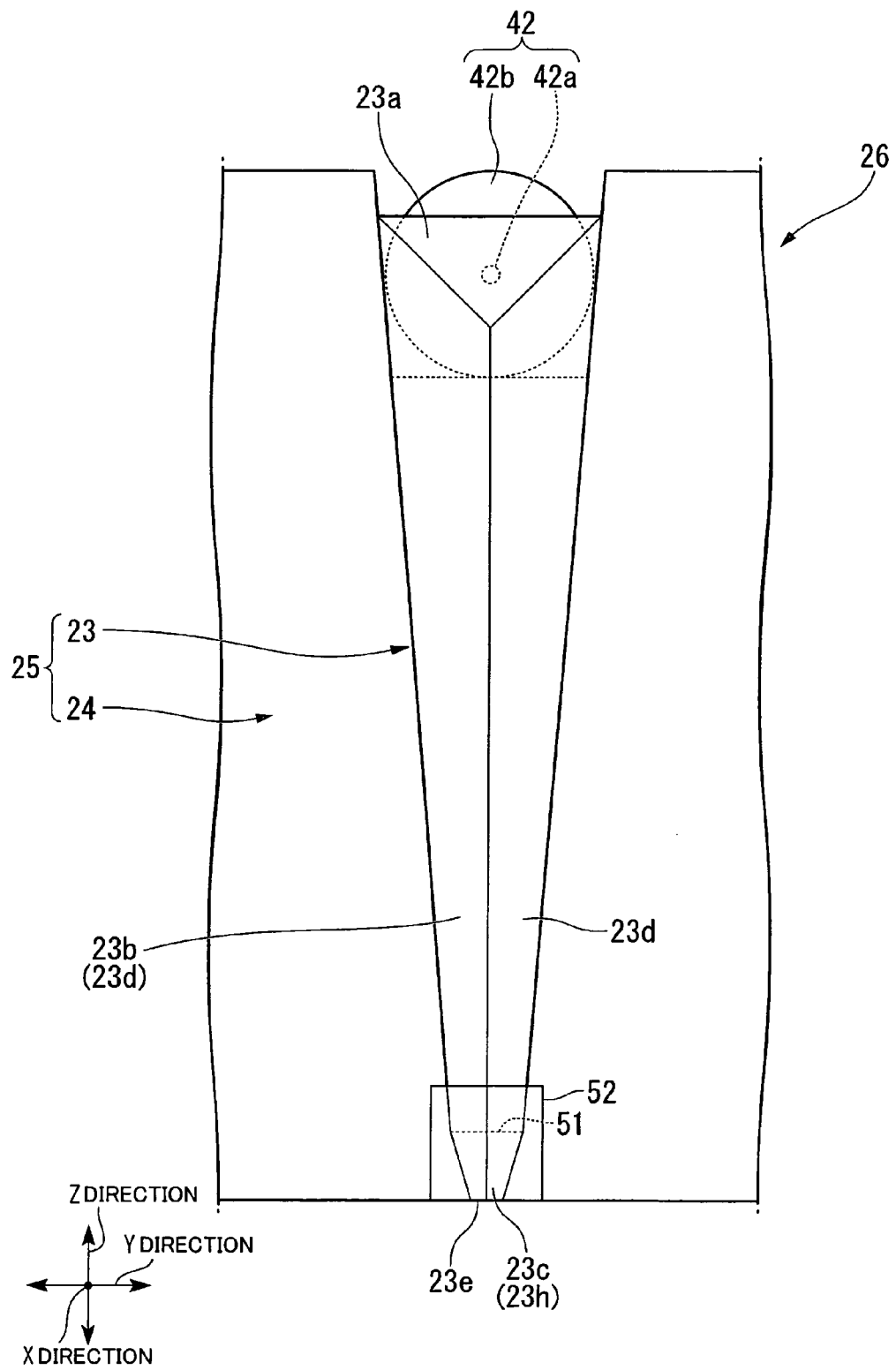
FIG. 4 is a diagram taken from an arrow A of FIG. 3.
Figure 5:
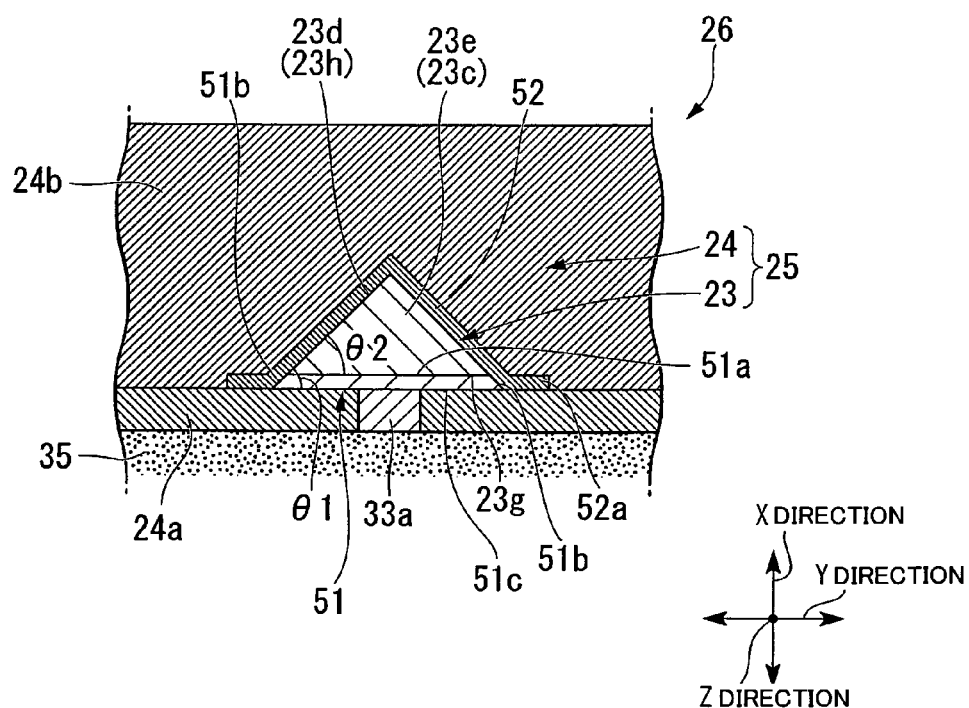
FIG. 5 is a diagram taken from an arrow B of FIG. 3.

FIG. 4 is a diagram taken in the direction of an arrow A of FIG. 3, and FIG. 5 is a diagram taken in the direction of an arrow of B of FIG. 3.

As shown FIGS. 3 to 5, a light flux propagation element 25 is fixed adjacent to the X direction side of the main magnetic pole 33 of the recording element 21 in the state in which the incident side (the Z direction one end side) of laser light L faces upward the slider 20 and the leaking side (the Z direction other end side) faces the disc D side. The light flux propagation element 25 includes a core 23 that propagates laser light L introduced from one end side to the other end side facing the disc D, and a cladding 24 that comes into close contact with the core 23, and the light flux propagation element 25 is formed in an approximately plate shape as a whole.

The core 23 is gradually drawn from one end side to the other end side and can propagate laser light L while gradually focusing the same in the inner portion. Specifically, the core 23 has a reflection surface 23a, a light flux focusing portion 23b, and a near-field light creating portion 23c from one end side, and is formed in a triangular shape when viewed from the propagation direction (the Z direction) of laser light L.

The reflection surface 23a reflects the laser light L introduced from an optical waveguide 42 (light flux induction means) 42 described later in a direction different from the introduction direction. In the present embodiment, the reflection surface 23a reflects laser light L so that the direction thereof is changed by about 90°. Laser light L introduced from the optical waveguide 42 by the reflection surface 23a is propagated toward the other end side while repeating the total reflection within the core 23.

The light flux focusing portion 23b is a portion that is drawn so that a cross-sectional area (a cross-sectional area of the XY direction) perpendicular to the Z direction facing from one end side to the other end side is gradually reduced, and the light flux focusing portion 23b propagates the introduced laser light L toward the other end side while focusing the same. That is, the light flux focusing portion 23b can gradually narrow the spot size of laser light L introduced into the light flux focusing portion 23b to a small size.

The near-field light creating portion 23c is a portion that is further drawn from the end portion of the light flux focusing portion 23b toward the other end side thereof. Specifically, the near-field light creating portion 23c is drawn by a sloped surface 23h that is formed so as to face the playback element 22 in the state of being tilted to the optical axis (the Z direction) of the laser light L propagated in the inner portion in the vicinity of the other end side of the core 23. The other end side of the core 23 is in a pointed state by the sloped surface 23h.

In addition, in the present embodiment, the light flux focusing portion 23b and the near-field light creating portion 23c are formed so as to have three side surfaces along the Z direction, and one side surface (one side surface) 23g of them is placed opposite to the main magnetic pole 33. In this case, on both ends (both ends of the Y direction) of the side surface 23g, a pair of side surfaces (the other side surface) 23d is formed which is extended toward the playback element 22 along a direction intersecting the Y direction (the plane direction) of the side surface 23g. As a result, the core 23 is formed in a triangular shape that is tapered toward the X direction when viewed from the Z direction. For that reason, as shown in FIG. 5, an end surface 23e exposed to the outside on the other end side of the near-field light creating portion 23c is formed in a triangular shape. Furthermore, the end surface 23e is designed so as to be flush with the ABS 20c of the slider 20.

As shown in FIGS. 3 to 5, the cladding 24 is formed of a material having a refractive index lower than that of the core 23. The cladding 24 comes into close contact with the side surfaces 23d and 23g of the core 23 in the state of exposing the end surfaces 23e of one end side and the other end side of the core 23 to the outside, and seals the core 23 in the inner portion. Specifically, the cladding 24 includes a first cladding 24a that is formed so as to cover the side surface 23g side of the core 23 between the core 23 and the recording element 21 (the main magnetic pole 33), and a second cladding 24b that is formed so as to cover the side surface 23d side between the core 23 and the playback element 22. In this manner, since the first cladding 24a and the second cladding 24b come into close contact with the side surfaces 23d and 23g of the core 23, a gap is not generated between the core 23 and the cladding 24. In addition, the tip portion 33a of the main magnetic pole 33 mentioned above is buried in a center portion of the slider 20 on the other end side of the first cladding 24a in the width direction (the Y direction), and the tip portion 33a is exposed from the first cladding 24a to the core 23 side.

In addition, an example of the combination of the material to be used as the cladding 24 and the core 23 will be described. For example, a combination is considered in which the core 23 is formed of quartz ($SiO_2$) and the cladding 24 is formed of quartz doped with fluorine. This case is a desirable combination since, when the wavelength of laser light L is 400 nm, the refractive index of the core 23 becomes 1.47 and the refractive index of the cladding 24 becomes less than 1.47.

Furthermore, a combination is also considered in which the cores 23 is formed of quarts doped with germanium and the cladding 24 is formed of quartz ($SiO_2$). This case is also a desirable combination since, when the wavelength of laser light L is 400 nm, the refractive index of the core 23 becomes greater than 1.47 and the refractive index of the cladding 24 becomes 1.47.

Particularly, since force confining laser light L within the core 23 is increased as the refractive difference between the core 23 and the cladding 24 is increased, it is more desirable that tantalum oxide ($Ta_2O_5$: the refractive index is 2.16, when the wavelength is 550 nm) is used for the core 23 (the core 23 and the second core 55) and quartz, alumina ($Al_2O_3$) or the like is used for the cladding 24 to increase the difference in the refractive indexes between them. Furthermore, in the case of using laser light L of an infrared region, it is also efficient to form the core 23 by silicon (Si: refractive index is about 4) that is a material transparent to infrared light.

Herein, a metal film (a near-field light generating portion) 51 is formed between the core 23 and the first cladding 24a. The metal film 51 generates the near-field light R from laser light L propagated through the core 23, localizes the near-field light R between the other end side of the light flux propagation element 25 and the disc D, and is formed of, for example, gold (Au), platinum (Pt) or the like. The metal film 51 is placed on the side surface 23g of the near-field light generating portion 23c in the core 23 (the core 23), and comes into contact with the first cladding 24a, and the tip portion 33a of the main magnetic pole 33 exposed from the first cladding 24a. Furthermore, the metal film 51 is formed so that on end side thereof is situated in the boundary portion between the near-field light creating portion 23c and the light flux focusing portion 23b and the other end side thereof is flush with the end surface 23e of the core 23 in the Z direction.

Furthermore, as shown in FIG. 5, the metal film 51 is formed in an isosceles trapezoidal shape that is tapered toward the playback element 22 side when viewed from the Z direction. At this time, a width of an upper bottom 51a of the metal film 51 in the Y direction is formed so as to be equal to a width of the side surface 23g of the core 23. In addition, the opposite end surfaces 51b of the metal film 51 are sloped and coplanar with the side surface 23d of the core 23. In this case, angles $\theta 1$ (angels between the slope surface 51b and the lower bottom 51c) of both end portions of the metal film 51 in the Y direction is formed to be equal to angles $\theta 2$ (angles between the side surface 23g and the side surface 23d) of both end portions of the near-field light creating portion 23c in the Y direction. That is, the laminated body of the core 23 and the metal film 51 is formed in a form similar to the core 23 when viewed from the Z direction (see FIG. 5).

Furthermore, a light shielding film (a second light shielding film) 52 is formed between the core 23 and the second cladding 24b. The light shielding film 52 is formed of a material having high reflectance such as aluminum (Al) and is formed so as to cover the side surface 23d of the near-field light creating portion 23c. That is, the near-field light creating portion 23c is configured so that the side surface 23g is covered with the metal film 51 and the side surface 23d is covered with the light shielding film 52. The light shielding film 52 is formed over a wide range further than the metal film 51 in the Z direction. Specifically, the light shielding film 52 is formed so that one end side thereof is situated on the other end side of the light flux focusing portion 23b and the other end side thereof is flush with the end surface 23e of the core 23. In addition, the light shielding film 52 may be formed in the range equal to or greater than the metal film 51 in the Z direction. Furthermore, both end portions of the light shielding film 52 in the Y direction are formed with bottom portions 52a extended on the first cladding 24a along the Y direction, but may cover at least the side surface 23d of the core 23.

Incidentally, as shown in FIG. 3, an optical waveguide 42 is fixed to the upper surface (one end side of the Z direction) of the slider 20. The optical waveguide 42 is constituted by the core 42a, and the cladding 42b formed so as to cover the core 42a, and laser light L is propagated in the core 42a. The tip of the optical waveguide 42 is connected to one end side of the core 23 of the light flux propagation element 25, and emits laser light L toward the reflection surface 23a. In addition, the core 42a and the cladding 42b are formed of the same materials as those of the core 23 and the cladding 24 mentioned above.

Figure 6:
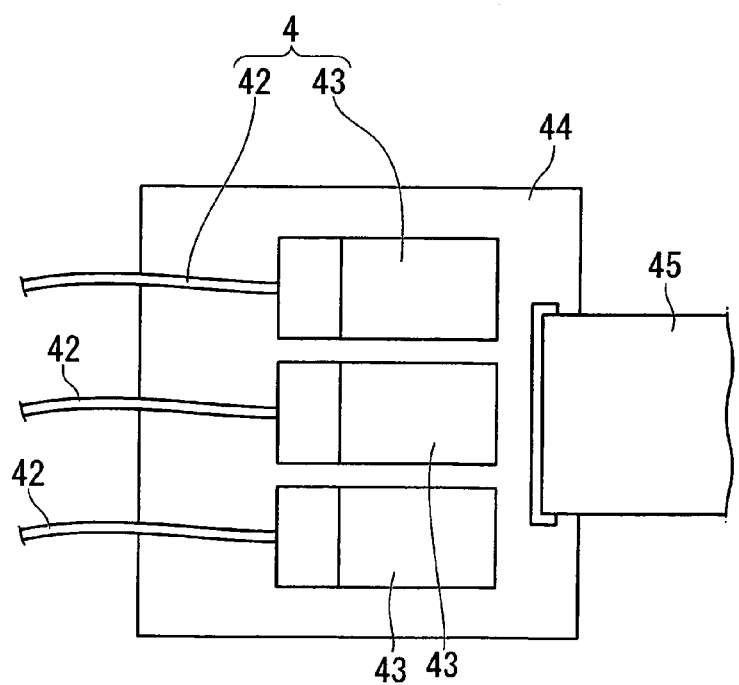
FIG. 6 is an enlarged view of the vicinity of a laser light source.

Meanwhile, as shown in FIG. 1, the proximal end side of the optical waveguide 42 is drawn along the beam 3 and the carriage 11 and then is connected to the laser light source (a light source) 43. As shown in FIGS. 1 and 6, the laser light source 43 is implemented on a control substrate 44 attached to the side surface of the proximal end portion 11a of the carriage 11 together with various electronic components such as an IC chip (not shown). Particularly, the laser light source 43 emits laser light L in the state of linear polarization. That is, the laser light source 43 and the optical waveguide 42 functions as the light flux incident mechanism 4 that makes laser light L incident to the recording and playback head 2 in the state of linear polarization. In addition, FIG. 6 is an enlarged view of the periphery of the laser light source.

The control substrate 44 with the laser light source 43 implemented thereon is connected to the control portion 8 by a flexible flat cable (a flexible substrate) 45. As a result, the control portion 8 sends electrical signal to each component to perform an overall control. Particularly, the laser light source 43 is configured so that the timing of emitting laser light L is controlled by the control portion 8.

The playback element 22 is a magneto-resistance effect film, in which the electrical resistance is converted depending on the magnitude of the magnetic field leaking from the perpendicular recording layer d2 (see FIG. 2) of the disc D, and is formed on the surface of the cladding 24 (the second cladding 24b) of the side opposite to the recording element 21 with the light flux propagation element 25 therebetween. Bias current is supplied from the control portion 8 to the playback element 22 via a lead film (not shown) or the like. As a result, the control portion 8 can detect a change in magnetic field leaking from the disc D as a change in voltage, whereby the playback of the signal from the change in voltage can be performed.

In addition, as shown in FIG. 2, the disc D of the present embodiment uses a vertical two layer film disc D that is constituted by at least two lasers of a perpendicular recording layer d2 having an easy magnetization axis in a direction vertical to the disc surface D1 and a soft magnetic layer d3 formed of high permeability material. As such a disc D, for example, a disc is used in which the soft magnetic layer d3, an intermediate layer d4, the perpendicular recording layer d2, a protective layer d5, and a lubricant layer d6 are sequentially formed on the substrate d1.

As the substrate d1, for example, an aluminum substrate, a glass substrate or the like are adopted. The soft magnetic layer d3 is a high permeability layer. The intermediate layer d4 is a crystal control layer of the perpendicular recording layer d2. The perpendicular recording layer d2 is a perpendicular anisotropy magnetic layer and uses, for example, CoCrPt-based alloy. The protective layer d5 is to protect the perpendicular recording layer d2 and uses, for example, a DLC (diamond-like carbon) film. The lubricant film d6 uses, for example, a fluorine-based liquid lubricant agent.

(Information Recording and Playback Method)

Next, a case will be described below where a variety of information is recorded and played on the disc D by the information recording and playback device 1 configured in this manner.

Firstly, as shown in FIG. 1, the spindle motor 6 is drive to rotate the disc D in a given direction. Next, the actuator 5 is operated and the beam 3 is scanned in the XY direction via the carriage 11. As a result, it is possible to position the recording and playback head 2 in a desired position on the disc D. At this time, the recording and playback head 2 is subjected to force floating by two convex portions 20b formed on the opposite surface 20a of the slider 20 and is pressed to the disc D side by the beam 3 or the like by predetermined force. The recording and playback head 2 floats to a position separated from the upper portion of the disc D by a predetermined distance H.

Furthermore, even when the recording and playback head 2 is subjected to wind pressure generated due to undulations of the disc D, since the displacement of the recording and playback head 2 in the Z direction is absorbed by the beam 3 and can be displaced around the XY direction axis by the gimbal portion 30, the wind pressure due to the undulations can be absorbed. For that reason, it is possible to cause the recording and playback head 2 to float in a stable state.

Figure 7:
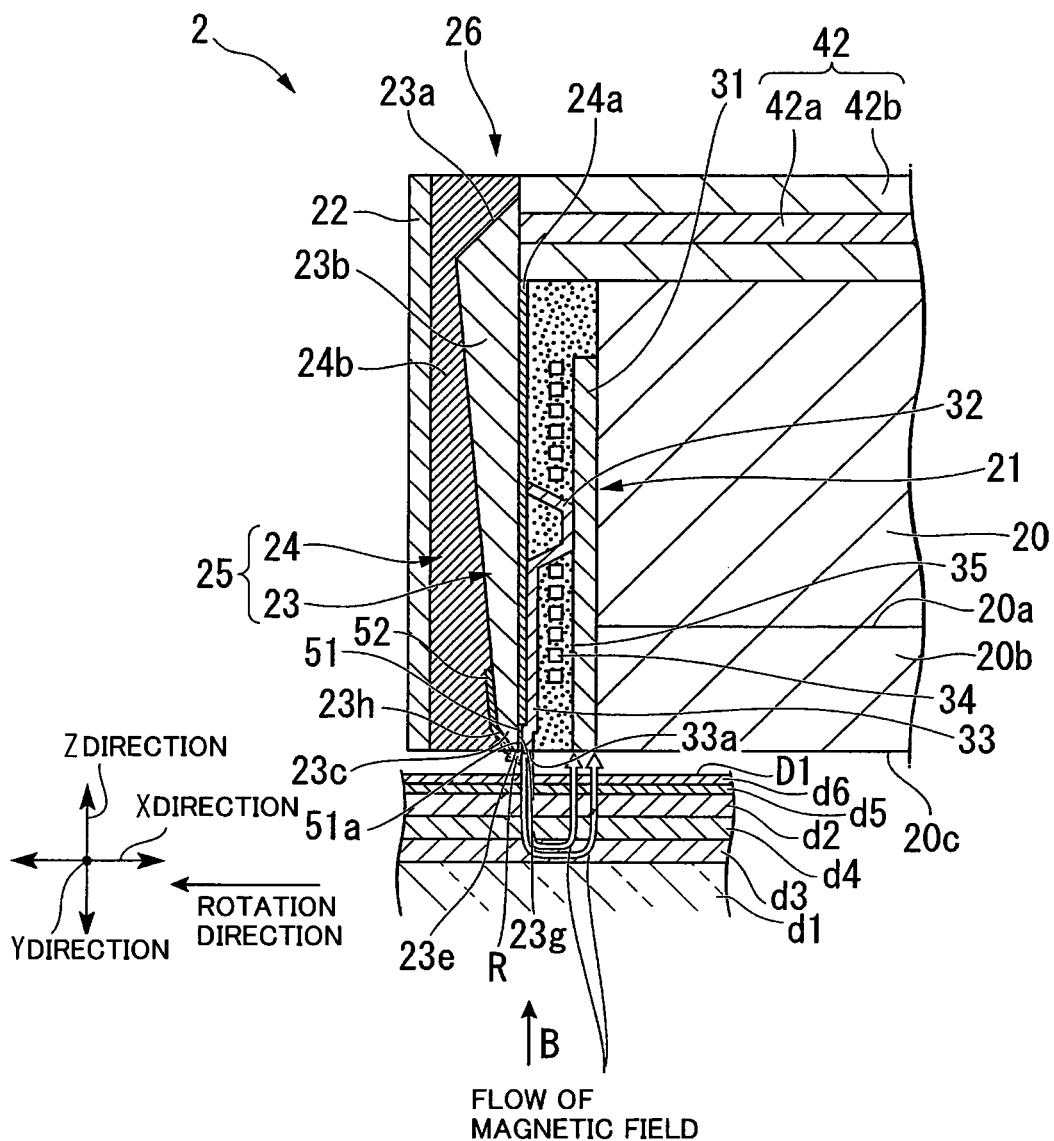
FIG. 7 is an explanatory diagram upon recording and playing information by the information recording and playback device and an enlarged cross-sectional view corresponding to FIG. 3.

FIG. 7 is an explanatory diagram upon recording and playing information by the information recording and playback device and FIG. 7 is an enlarged cross-sectional view corresponding to FIG. 3.

Herein, as shown in FIG. 7, in the case of performing the recording of information, the control portion 8 operates the laser light source 43 to emit the laser light L of the linear polarization, and supplies the coil 34 with the electric current modulated depending on information to operate the recording element 21.

Firstly, laser light L is incident from the laser light source 43 to the optical waveguide 42, and laser light L is guided to the slider 20 side. Laser light L emitted from the laser light source 43 progresses in the core 42a of the optical waveguide 42 toward the tip (the outflow end) side, and is propagated into the core 23 of the light flux propagation element 25. Laser light L propagated into the core 23 is reflected by the reflection surface 23a by about 90°, and then is propagated into the light flux focusing portion 23b. Laser light L propagated into the light flux focusing portion 23b is propagated toward the other end side situated on the disc D side while repeating the total reflection between core 23 and the cladding 24. Particularly, since the cladding 24 comes into close contact with the side surfaces 23d and 23g of the core 23, light does not leak to the outside of the core 23. Thus, it is possible to propagate the introduced laser light L to the other end side while squeezing the same without waste and make laser light L incident to the near-field light creating portion 23c.

At this time, the core 23 is drawn so that the cross-sectional area perpendicular to the Z direction is gradually reduced. For that reason, laser light L is gradually squeezed as it is propagated into the light flux focusing portion 23b, whereby the spot size is reduced.

Next, laser light L having the reduced spot size is incident to the near-field light creating portion 23c. The near-field light creating portion 23c is further drawn toward the other end side, and the end surface 23e has the size equal to or less than the wavelength of light. In this case, two side surfaces 23d of the near-field light creating portion 23c is shield by the light shielding film 52. Thus, laser light L incident to the near-field light creating portion 23c is propagated while being reflected by the interface between the light shielding film 52 and the near-field light creating portion 23c without leaking to the second cladding 24b side. Moreover, when laser light L propagated to the near-field light creating portion 23c is incident to the metal film 51, the surface Plasmon is excited to the metal film 51. The excited surface Plasmon is propagated toward the other end side of the core 23 along the interface of the metal film 51 and the core (the near-field light creating portion 23c) while being enhanced by resonance effect. Moreover, at the time of reaching the other end side, the surface Plasmon becomes the near-field light R having strong light intensity and leaks to the outside. That is, it is possible to localize the near-field light R between the other end side of the light flux propagation element 25 and the disc D. Then, the disc D is locally heated by the near-field light R and coercive force is temporarily lowered.

Meanwhile, when the electric current is supplied to the coil 34 by the control portion 8, since the current magnetic field generates the magnetic field within the magnetic circuit 32 by the principle of electromagnet, it is possible to generate the recording magnetic field of the vertical direction with respect to the disc D between the main magnetic pole 33 and the return pole 31. Then, the magnetic flux generated from the main magnetic pole 33 side directly escapes the perpendicular recording layer d2 of the disc D and reaches the soft magnetic layer d3. As a result, it is possible to perform the recording in the state in which the magnetization of the perpendicular recording layer d2 faces vertically to the disc surface D1. Furthermore, the magnetic flux reaching the soft magnetic layer d3 returns to the return pole 31 via the soft magnetic layer d3. At this time, the magnetic flux does not influence in the direction of the magnetization upon returning to the return pole 31. This is because the area of the return pole 31 facing the disc surface D1 is greater than that of the main magnetic pole 33, and thus, force is not generated in which the magnetic flux density greatly reverses the magnetization. That is, the recording can be performed only on the main magnetic pole 33 side.

As a result, it is possible to perform the recording of information by the hybrid magnetic recording method in which the near-field light R cooperates with the recording magnetic field generated in both magnetic poles 31 and 33. In addition, since the recording is performed by the perpendicular recording method, the recording is hardly affected by the thermal fluctuation phenomenon or the like and stable recording can be performed. Thus, the reliability of the writing can be enhanced.

Furthermore, in the case of playing information recorded on the disc D, when the coercive force of the disc D is temporarily lowered, the playback element 22 receives the magnetic field leaking from the perpendicular recording layer d2 of the disc D, and the electric resistance is changed depending on the magnitude thereof. Thus, the voltage of the playback element 22 is changed. As a result, the control portion 8 can detect a change in magnetic field leaking from the disc D as a change in voltage. Moreover, the control portion 8 can perform the playback of information recorded on the disc D by performing the playback of the signal from the change in voltage.

(Manufacturing Method of Recording and Playback Head)

Next, a method of manufacturing the recording and playback head 2 having the near-field light generating element 26 mentioned above will be described. FIGS. 8A to 9D are diagrams corresponding to FIG. 5 and process diagrams for describing the manufacturing method of the near-field light generating element. In addition, in the description mentioned below, among the manufacturing processes of the recording and playback head 2, a manufacturing process of the near-field light generating element will be mainly and specifically described.

In the present embodiment, a substrate 120 (for example, AlTiC (altic) or the like) is provided in which a plurality of slider 20 forming regions is aligned along the Y direction and the Z direction, the recording element 21, the near-field light generating element 26, and the playback element 22 are sequentially formed on each forming region of the slider 20 in the substrate 120 to form a plurality of recording and playback head 2 aligned along the Y direction and the Z direction, and then the dicing is performed for each forming region of the recording and playback head 2, thereby manufacturing the recording and playback head 2. In addition, in FIGS. 8A to 9D, in order to facilitate the description, among the recording element 21 formed on the substrate 120, the description of the return pole 31, the magnetic circuit 32, the coil 34 and the insulator 35 molding them will be omitted.

Figure 8A:
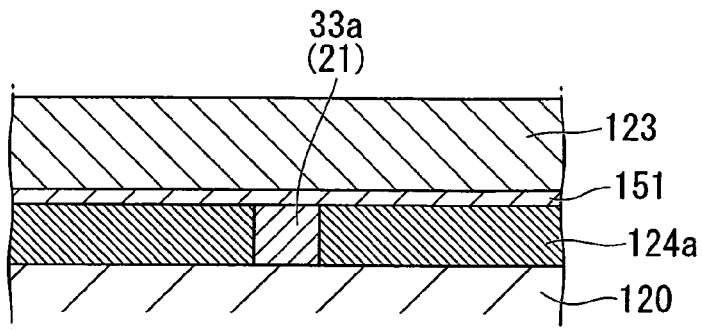
FIGS. 8A to 8D are diagrams corresponding to FIG. 5 and process diagrams for describing a method of manufacturing a near-field light generating element.
Figure 8A:
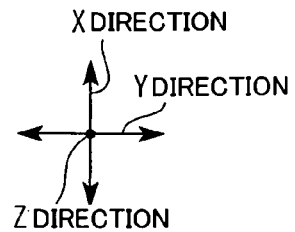

Firstly, as shown in FIG. 8A, after the recording element 21 is formed on the substrate 120, the base materials of the light flux propagation element 25 and the metal film 51 are formed thereon (a first cladding forming process, a near-field light generating process, and a core forming process). Specifically, the base materials (the first cladding base material 124a, the metal film base material 151, and the core base material 123) are formed on the substrate 120 (the main magnetic pole 33) in the order of the first cladding 24a, the metal film 51 (for example, about 20 nm), and the core 23 (about several μm). In addition, after forming the respective base materials 123, 124a, and 151, the respective surfaces are polished by a CMP (Chemical Mechanical Polishing) or the like to form flat surfaces.

In addition, it is desirable that the metal film base material 151 be patterned in advance so that only a predetermined region remains after being formed on the whole surface on the first cladding base material 124a. In the present embodiment, the metal film base material 151 is patterned so as to remain in a region equivalent to the near-field light creating portion 23c (see FIG. 3) in the core base material 123 at least in the Z direction (so as to remove the metal film base material 151 of the region equivalent to the reflection surface 23a and the light flux focusing portion 23b (see FIG. 3)). In this case, in the region equivalent to the near-field light creating portion 23c, the metal film base material 151 is interposed between the core base material 123 and the first cladding base material 124a, and in other regions, the core base material 123 and the first cladding base material 124a come into close contact with each other. As a result, since it is possible to improve the adherence between the core base material 123 and the first cladding base material 124a, the film peeing during manufacturing can be suppressed.

Furthermore, in the near-field light generating element 26 (see FIGS. 2 and 3) mentioned above, when the metal film 51 is also formed in the light flux focusing portion 23b of the core 23 in the Z direction, laser light L propagated through the light flux focusing portion 23b is absorbed by the metal film 51 and becomes the loss, whereby the propagation efficiency of laser light L may decline. On the contrary to this, by forming the metal film 51 only in the region equivalent to the near-field light creating portion 23c, it is possible to propagate laser light L between the core 23 and the cladding 24 by the total reflection condition up to the near-field light creating portion 23c. For that reason, it is possible to guide more laser light L to the near-field light creating portion 23c, which can improve the propagation efficiency of laser light L.

Figure 8B:
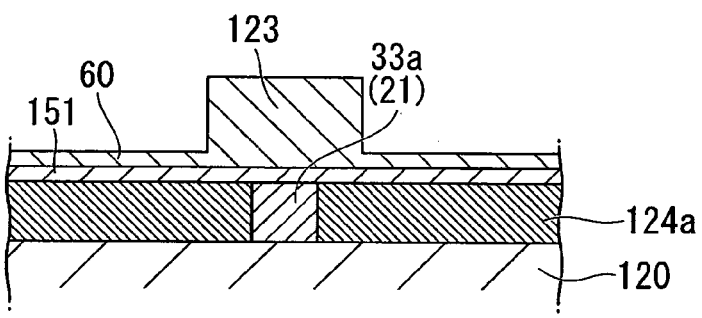
Figure 8B:
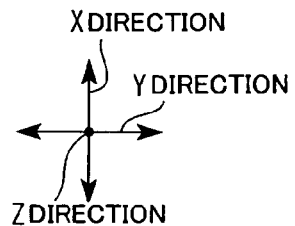

Next, as shown in FIG. 8B, on the core base material 123, a mask pattern (not shown) is formed in which a region, where the core base material 123 needs to be removed, is opened. Furthermore, a reactive ion etching (RIE) is performed via the mask pattern (a first patterning process). As a result, the core base material 123 of the region with the opened mask pattern is etched, and the core base material 123 of a rectangular shape when viewed in the Z direction is formed. Furthermore, the core base material 123 is formed in a trapezoidal shape that is tapered from one end side to the other end side when viewed from the X direction. In addition, in the first patterning process, it is desirable that the core base material 123 of the region with the opened mask pattern is not completely removed but slightly remains (see the remaining portion 60 of FIG. 8B).

Figure 8C:
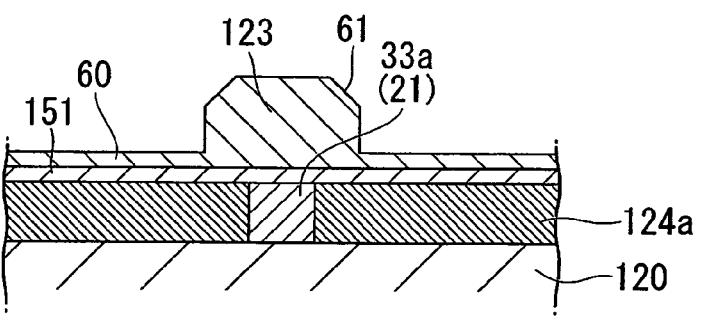
Figure 8C:
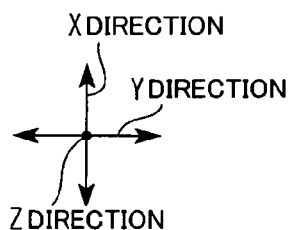
Figure 8D:
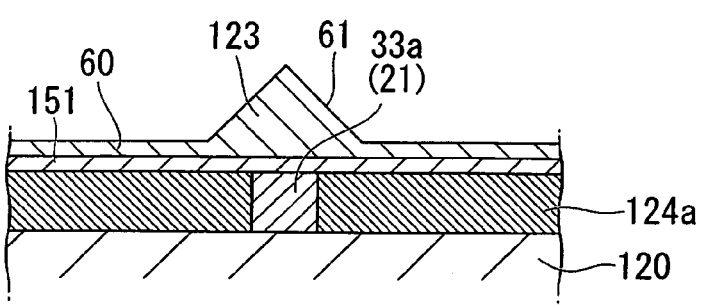
Figure 8D:
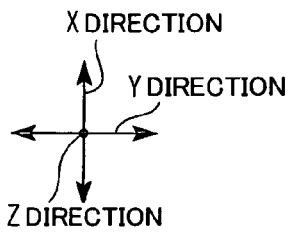

Next, as shown in FIG. 8C, in the plasma process of argon (Ar) or the like the core base material 123 and the metal film base material 151 are subjected to a sputter etching (a second patterning process). In the second patterning process, when the core base material 123 having the cross section of the rectangular shape is subjected to the sputter etching, the corner portion of the core base material 123 is selectively etched, whereby a sloped surface 61 is formed. Moreover, when the etching is further continued in this state, the sloped surface 61 is etched while maintaining a certain angle with respect to the bottom surface (equivalent to the side surface 23g of FIG. 5), whereby the core base material 123 having the cross section of the triangular shape shown in FIG. 8D is formed.

Figure 9A:
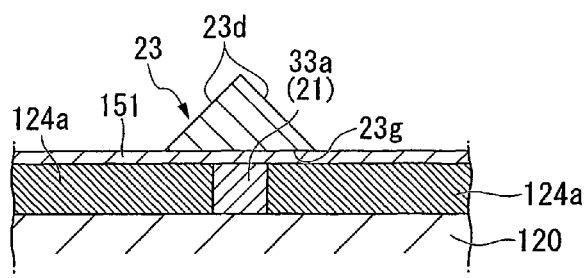
FIGS. 9A to 9D are diagrams corresponding to FIG. 5 and process diagrams for describing a method of manufacturing a near-field light generating element.
Figure 9A:
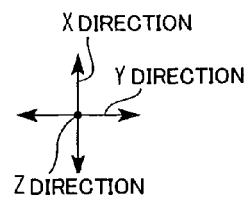

After that, when the etching is continued, as shown in FIG. 9A, the width (width in the Y direction) and the height (height in the X direction) of the core base material 123 are reduced while maintaining the similar shape, and the remaining portion 60 is removed. As a result, the triangular core 23 having three side surfaces 23d, 23g is formed. In this manner, by performing the sputter etching on the core base material 123 formed in the rectangular shape by the first patterning process, it is possible to form the core 23 at any width or height when viewed from the Z direction.

Figure 9B:
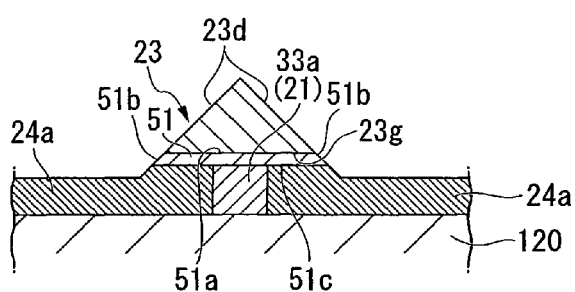
Figure 9B:
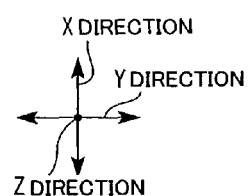

Herein, when the etching is further continued after removing the remaining portion 60, the core 23 is etched while maintaining the similar shape, and the metal film base material 151 is etched. In this case, as shown in FIG. 9B, the end portion (equivalent to the sloped surface 51b in FIG. 5) of the metal film base material 151 in the Y direction is etched at the same angle as that between the side surface 23d and the side surface 23g of the core 23.

In this manner, the upper bottom 51a has the same width as that of the side surface 23g of the core 23, and the metal film 51 is formed in which the sloped surface 51b is placed on the same surface as the side surface 23d of the core 23. In addition, in order to completely remove the metal film base material 151 of the region other than the core 23, the first cladding base material 124a is also slightly etched. In this case, in the first patterning process mentioned above, by forming the remaining portion 60 in the core base material 123, it is possible that the first cladding base material 124a is overetched in the second patterning process.

Figure 9C:
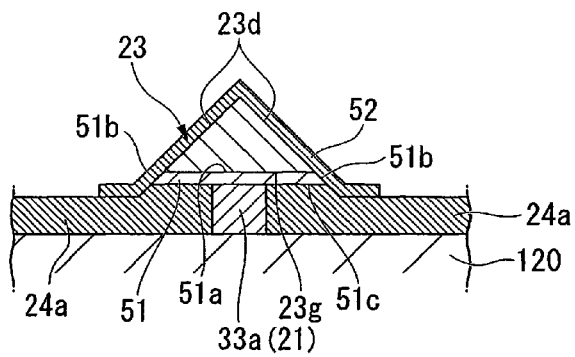
Figure 9C:
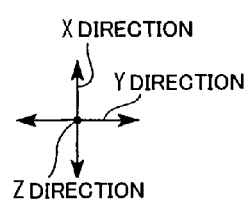
Figure 9D:
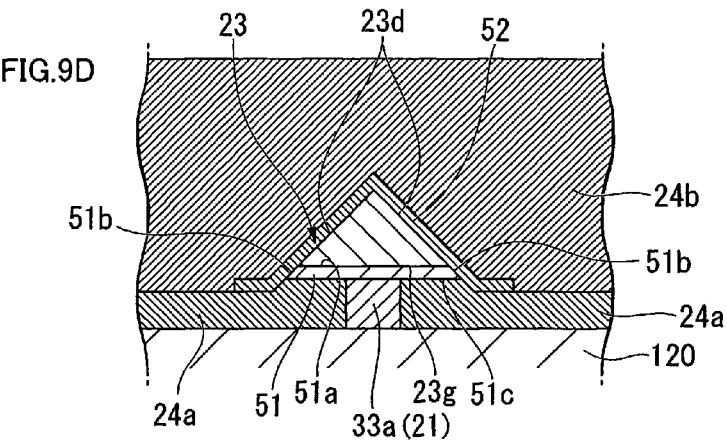
Figure 9D:
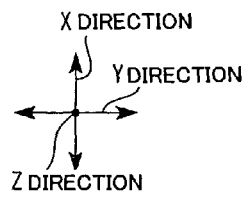

Next, as shown in FIG. 9C, the light shielding film 52 is formed so as to cover the core 23 and the metal film 51 (a light shielding film forming process). Specifically, the light shielding film 52 is patterned so as to remain in a region equivalent to the near-field light generating portion 23c on the side surface 23d of the core 23, Moreover, as shown in FIG. 9D, a second cladding 24b is formed so as to cover the core 23 and the light shielding film (a second cladding forming process). After that, the surface of the second cladding 24b is polished by a CMP or the like to form the flat surface. Moreover, the playback element 22 is formed on the second cladding 24b. As a result, the recording element 21, the near-field light generating element 26, and the playback element 22 are formed on the substrate 120.

Next, the substrate 120 is diced along the Y direction in the state of being spaced for each slider 20 along the Z direction, and a bar (not shown) of the state, in which a plurality of sliders 20 is aligned along one direction (the Y direction), is formed. After that, the side surface (the cutting surface) of the diced bar is polished (the polishing process). In the polishing process, the positioning of the side surface of the bar is performed by the use of an ELG (electro lapping guide). The ELG is to perform the polishing while confirming a value of resistance of the ELG element and control an amount of polishing. In the present embodiment, for example, in an ELG area (a dicing value in a sliding process described later) of the bar, an ELG element, and a pair of pads connected to both ends of the ELG element are formed, and the polishing is performed while causing electric current to flow to the ELG element via the pads. Then, the ELG element is also polished together with the side surfaces of the bar, and the width of the ELG element in the Z direction is reduced, whereby the electric resistance is increased. Thus, a correlation between the electric resistance of the ELG element and the amount of polishing is obtained in advance, the polishing is performed while monitoring the resistance value of the ELG element, when the resistance value reaches a predetermined value, it is decided that a desired amount of polishing is obtained, and the polishing is finished. In addition, since the ELG element or the pad has a basic function of detecting a change in electric resistance during polishing, there is no need for an extreme fine structure.

After that, the bar is cut along the Z direction so as to become sizes for each slider 20 (the slider process).

As mentioned above, the recording and playback element having the near-field light generating element 26 is completed.

In this manner, in the present embodiment, a configuration was adopted in which the metal film base material 151 is formed between the first cladding base material 124a and the core base material 123 in the film forming process, and the core base material 123 and the metal film base material 151 are collectively etched in the second patterning process.

According to this configuration, by collectively patterning the core base material 123 and the metal film base material 151 by the same patterning process, the metal film 51 can be simply formed in which the upper bottom 51a has the same width as the side surface 23g of the core 23 and the sloped surface 51b is placed on the same surface of the side surface 23*d* of the core 23. That is, the core 23 and the metal film 51 are formed so as to overlap with each other when viewed from the X direction.

As a result, for example, unlike the case where the core 23 and the metal film 51 are patterned by the separate processes, respectively, the metal film 51 and the core 23 can be accurately positioned. Thus, since laser light L propagated to the near-field light creating portion 23*c* can be fully incident to the metal film 51, the generation efficiency of the near-field light R can be improved.

Furthermore, in the present embodiment, by forming the light shielding film 52 so as to cover the side surface 23*d* of the core 23, laser light L incident to the near-field light creating portion 23*c* is propagated while being reflected from the interface between the light shielding film 52 and the near-field light creating portion 23*c* without leaking to the second cladding 24*b* side. As a result, laser light L can be effectively incident to the metal film 51, which can improve the generation efficiency of the near-field light R.

Furthermore, by the use of the ELG in the polishing process, the end surface (for example, the end surface 23*e* of the other end side of the near-field light generating element 26) of the slider 20 can be accurately positioned. As a result, the near-field light R can be further effectively generated.

Moreover, since the information recording and playback device 1 (the recording and playback head 2) of the present invention includes the near-field light generating element 26 mentioned above, the recording and playback of information can accurately and densely be performed, whereby increased quality can be promoted.

Second Embodiment

Figure 10:
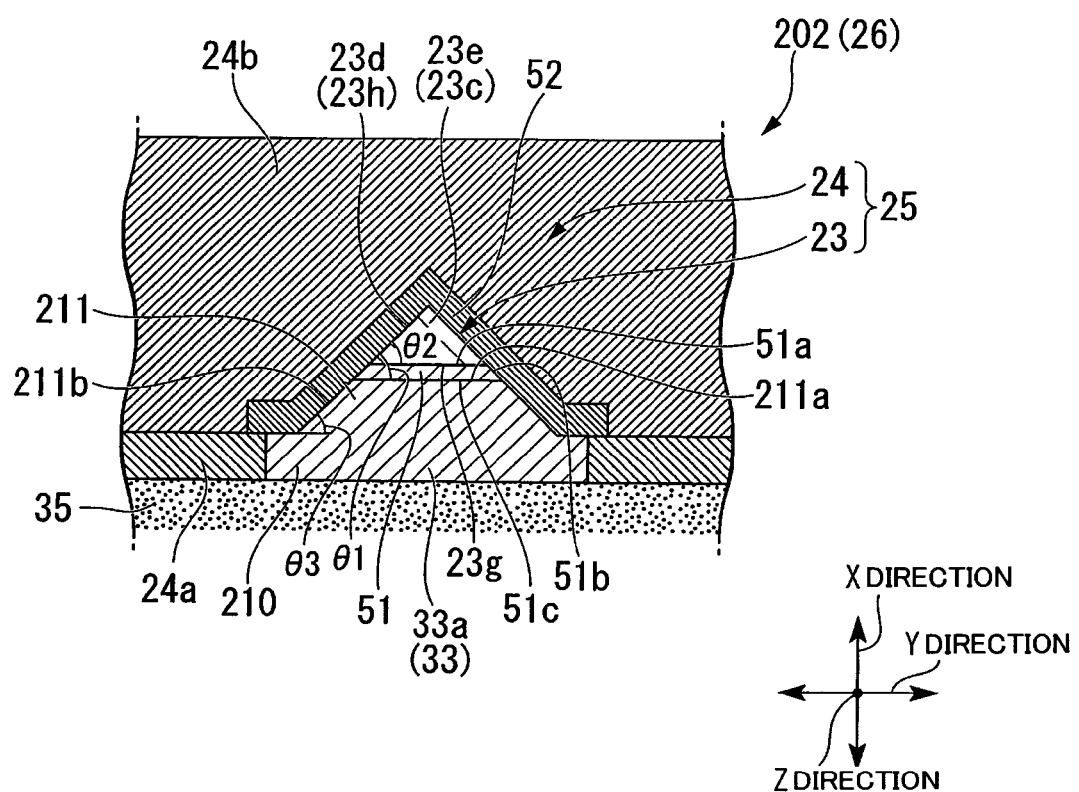
FIG. 10 is a diagram corresponding to FIG. 5 that shows a recording and playback head in a second embodiment.

Next, a second embodiment of the present invention will be described. FIG. 10 is a diagram equivalent to FIG. 5 that shows a recording and playback head in a second embodiment. The present embodiment is different from the embodiments mentioned above in that an external end portion of a tip portion 33*a* (a sloped surface 211*b* of a protrusion portion 211 described later) of the main magnetic pole 33 is placed on the same surface together with the side surface 23*d* of the core 23 and the sloped surface 51*b* of the metal film 51. In addition, in the description mentioned below, the same configurations as the first embodiment are denoted by the same reference numerals and the descriptions thereof will be omitted.

As shown in FIG. 10, the tip portion 33*a* of the main magnetic pole 33 in the recording and playback head 202 of the present embodiment has a base portion 210 that is buried in the first cladding 24*a*, and a protrusion portion 211 that is protruded from the base portion 210 toward the core 23 side along the X direction.

The protrusion portion 211 is formed in an isosceles trapezoidal shape that is tapered toward the core 23 side when viewed from the Z direction. Specifically, the width of the upper bottom 211*a* of the protrusion portion 211 in the Y direction is formed so as to have the same width as the lower bottom 51*c* of the metal film 51. In addition, the sloped surface 211*b* of the protrusion portion 211 is placed on the same surface of the side surface 23*d* of the core 23 and the sloped surface 51*b* of the metal surface 51. In this case, an angle θ3 (an angle between the sloped surface 211*b* and the base portion 210) of both end portions of the protrusion portion 211 in the Y direction is formed to be equal to the angle θ1 of the metal film 51 or the angle θ2 of the near-field light creating portion 23*c*. That is, the laminated body of the core 23, the metal film 51, and the protrusion portion 211 is formed in the shape similar to the core 23 when viewed from the Z direction.

Figure 11A:
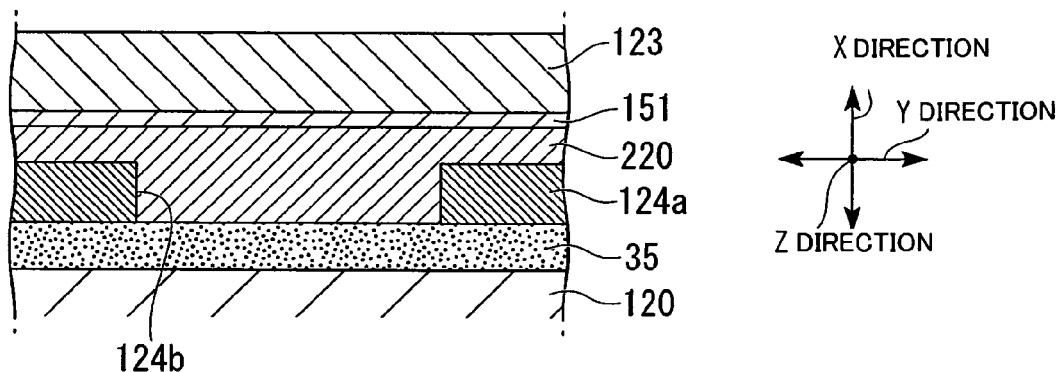
FIGS. 11A and 11B are process diagrams for describing a method of manufacturing the recording and playback head corresponding to FIG. 10.
Figure 11B:
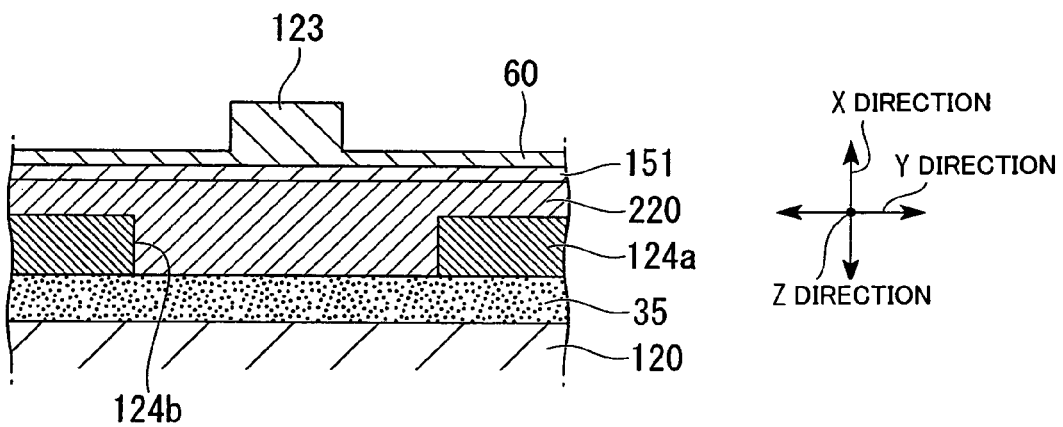

The recording and playback head 202 of the present embodiment can be manufactured by going through the process that is substantially equal to the manufacturing method of the recording and playback head 2 of the first embodiment mentioned above. FIGS. 11A and 11B are process diagrams for describing a method of manufacturing the recording and playback head corresponding to FIG. 10.

Firstly, as shown in FIG. 11A, the first cladding base material 124*a* is pattered so that the opening portion 124*b* is formed in the forming region of the tip portion 33*a* of the main magnetic pole 33, and the base material (hereinafter, referred to as a magnetic pole base material 220) of the tip portion 33*a* of the main magnetic pole 33 on the first cladding base material 124*a* is formed so as to bury the opening 124*b* (the magnetic pole forming process). In addition, the opening portion 124*b* of the first cladding 124*a* is formed up to the depth to which the insulator 35, and the proximal end portion of the main magnetic pole 33 molded into the insulator 35 are exposed. As a result, although it is not shown, the magnetic pole base material 220 is connected to the proximal end portion of the main magnetic pole 33 within the insulator 35.

Next, as shown in FIG. 11B, like the first embodiment mentioned above, after forming the metal film base material 151 and the core base material 123, a reactive ion etching (RIE) is performed on the core base material 123 via a mask pattern (not shown) by the same method as the first patterning process mentioned above. In this case, the core base material 123 is patterned so that, when viewed from the Z direction, the width in the Y direction of a portion remaining in the rectangular shape in the core base material 123 becomes narrower than the width (the width of the opening portion 124*b* along the Y direction) of a portion in the magnetic pole base material 220 buried in the opening portion 124*b* of the first cladding 124*a*.

After that, the sputter etching is performed by the same method as the second patterning process mentioned above, and the core base material 123, the metal film base material 151, and the magnetic pole base material 220 are collectively etched. Next, by going through the same process as that of the first embodiment mentioned above, the recording and playback head 202 shown in FIG. 10 mentioned above can be manufactured.

In this manner, in the present embodiment, by collectively patterning the base material of the tip portion 33*a* of the main magnetic pole 33 together with the core 23 and the metal film 51 by the same patterning process, the side surface 23*d* of the core 23, the sloped surface 51*b* of the metal film 51, and the sloped surface 211*b* in the protrusion portion 211 of the main magnetic pole 33 are placed on the same surface when viewed from the Z direction. As a result, for example, unlike a case where the core 23, the metal film 51, and the main magnetic pole 33 are patterned by separate processes, respectively, it is possible to accurately position the core 23, the metal film 51, and the main magnetic pole 33. In addition, since the core 23, the metal film 51, and the main magnetic pole 33 can be accurately positioned without using an expensive positioning device, the device cost can be reduced.

In this case, the tip portion 33*a* of the main magnetic pole 33 is formed so as to cover the metal film 51 from the opposite side of the core 23 with the metal film 51 interposed therebetween. For that reason, it is possible to precisely the generating position of the near-field light R and the position the generating position of the magnetic field from the main magnetic field 33, which can improve the reliability of the writing of the recording and playback head 202 itself to promote increased quality.

Furthermore, even if the light flux is transmitted through the metal film 51 without causing the Plasmon resonance by the metal film 51, by reflecting the light flux to the upper bottom 211a of the protrusion portion 211 to return into the core 23, the light flux can be incident to the metal film 51 again. As a result, the generation efficiency of the near-field light R can be further improved. In addition, since it is possible to suppress that the light flux leaks to the outside without causing Plasmon resonance by the metal film 51, it is possible to crate the spot of the extremely small near-field light R only in the vicinity of the core 23.

Third Embodiment

Figure 12:
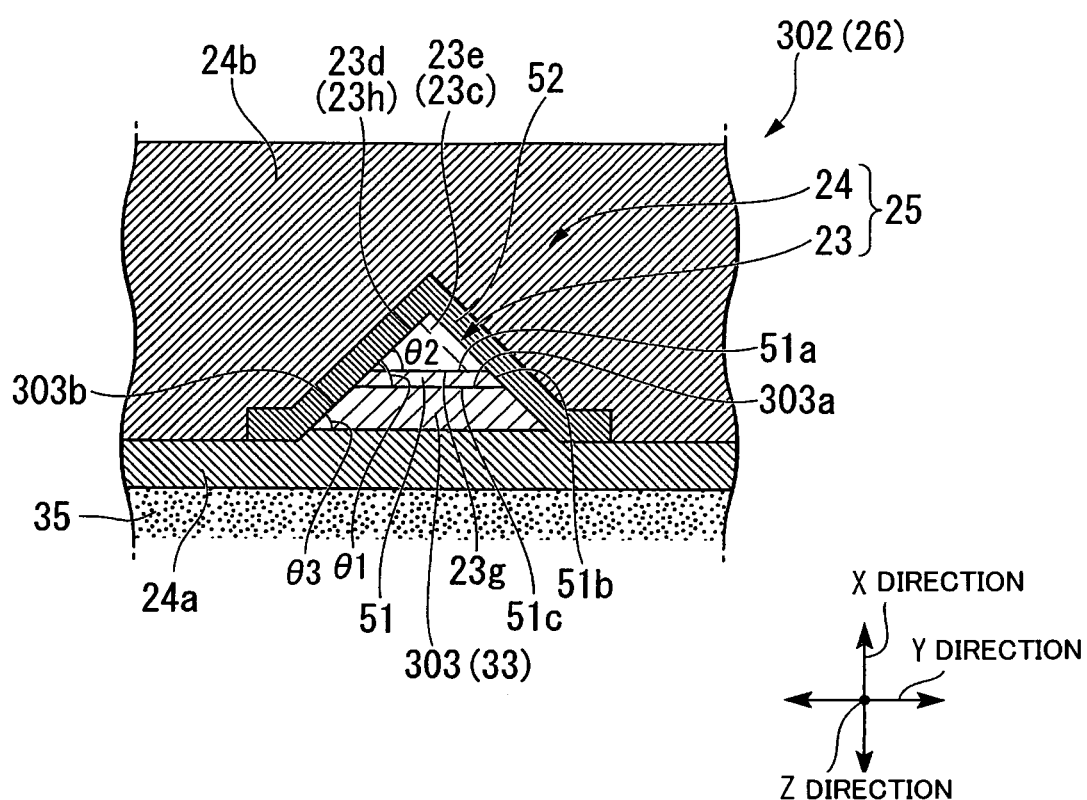
FIG. 12 is a diagram corresponding to FIG. 5 that shows a recording and playback head in a third embodiment.

Next, a third embodiment will be described. FIG. 12 is a diagram that shows a recording and playback head in a third embodiment corresponding to FIG. 5.

As shown in FIG. 12, in a recording and playback head 302 of the present embodiment, a tip portion 303 of the main magnetic pole 33 is placed between the first cladding 24a and the metal film 51. The tip portion 303 of the main magnetic pole 33 is formed so that an end side along the Z direction is connected to a proximal end portion of the main magnetic pole 33 molded into the insulator 35, and meanwhile, the other end side is flush with the end surface 23e of the core 23. Furthermore, the tip portion 303 is formed in an isosceles trapezoidal shape that is tapered toward the core 23 side when viewed from the Z direction. Specifically, the width of the upper bottom 303a of the tip portion 303 in the Y direction is formed to be equal to the width of the lower bottom 51c of the metal film 51. In addition, the sloped surface 303b of the tip portion 303 is placed on the same surface as the side surface 23d of the core 23 and the sloped surface 51b of the metal surface 51. That is, the laminated body of the core 23, the metal film 51, and the tip portion 303 are formed in the shape similar to the core 23 when viewed from the Z direction, and all of each side surface (and the sloped surface) of the laminated body mentioned above are covered by the light shielding film 52.

Figure 13A:
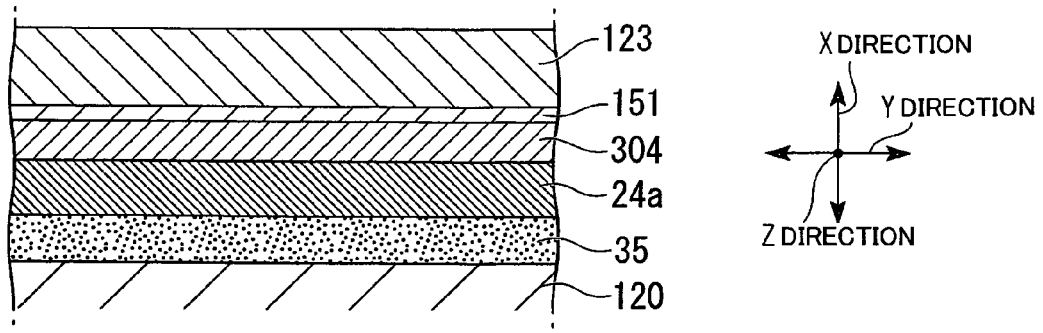
FIGS. 13A to 13C are process diagrams for describing a method of manufacturing the recording and playback head corresponding to FIG. 12.
Figure 13B:
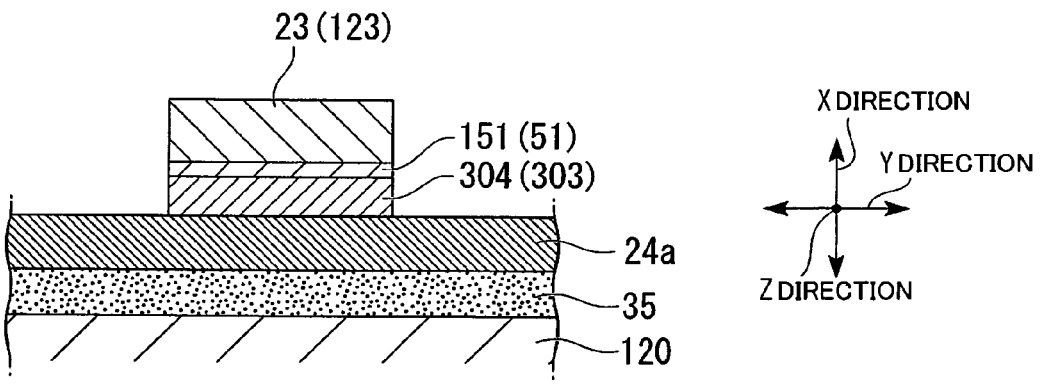
Figure 13C:
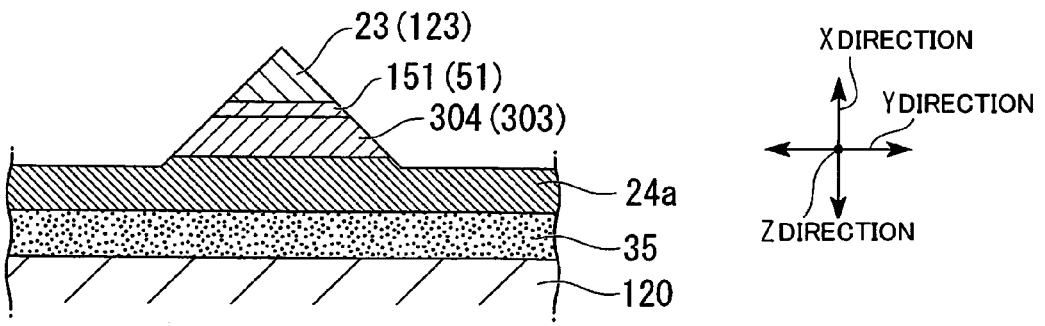

FIGS. 13A to 13C are process diagrams for describing a method of manufacturing the recording and playback head corresponding to FIG. 12.

As shown in FIG. 13A, in order to manufacture a recording and playback head 302 of the present embodiment, firstly, a magnetic pole base material 304 is formed on the first cladding 24a (a magnetic pole forming process). In addition, although it is not shown, the magnetic pole base material 304 is connected to the proximal end portion of the main magnetic pole 33 through the first cladding 24a and the insulator 35.

Next, as shown in FIG. 13B, like the first embodiment mentioned above, after forming the metal film base material 151 and the core base material 123, the reactive ion etching (RIE) is performed on the core base material 123 via a mask pattern (not shown) by the same method as the first patterning process mentioned above. In the first patterning process of the present embodiment, by collectively etching the core base material 123, the metal film base material 151, and the magnetic pole base material 304 along the X direction, the laminated body of the core base material 123, the metal film base material 151, and the magnetic pole base material 304 remains in the rectangular shape when viewed from the Z direction.

Next, as shown in FIG. 13C, the sputter etching is performed by the same method as the second patterning process mentioned above, and the core base material 123, the metal film base material 151, and the magnetic pole base material 304 are collectively etched. At this time, by performing the etching until the surface of the first cladding 24a is slightly removed, all of the corner portion and the side surface of the magnetic pole base material 304 are removed, whereby the tip portion 303 having the same surface (the sloped surface 303b) as the side surface 23d of the core 23 and the sloped surface 51b of the metal film 51 is formed.

Next, by going through the same process as that of the first embodiment mentioned above, the recording and playback head 302 shown in FIG. 12 mentioned above can be manufactured.

Figure 14:
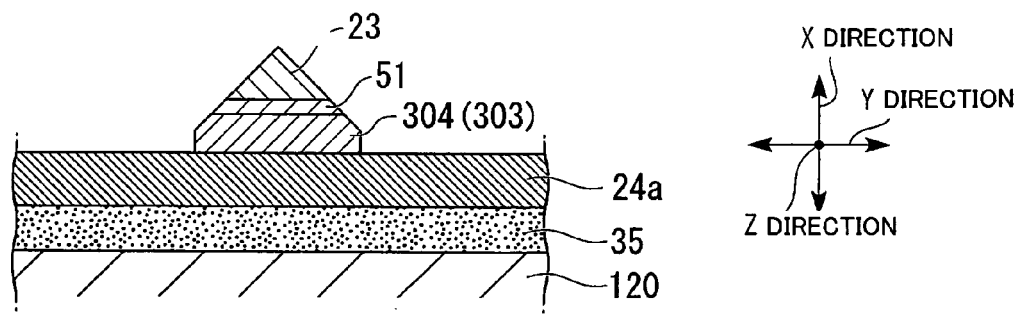
FIG. 14 is a diagram for describing another manufacturing method of the recording and playback head corresponding to FIG. 5.

In this manner, according to the present embodiment, the same effect as the second embodiment mentioned above can be exhibited, and it is possible to cope with the high density recording by further reducing the near-field light R generated from the metal film 51 and the magnetic field generated from the tip portion 303 of the main magnetic pole 33. In addition, in the third embodiment mentioned above, although a configuration was described in which all of the corner portion and the side surface of the magnetic pole base material 304 are removed in the second patterning process, as shown in FIG. 14, the etching may be finished in the state in which the side surface of the magnetic pole base material 304 remains, without being limited thereto.

Fourth Embodiment

Figure 15:
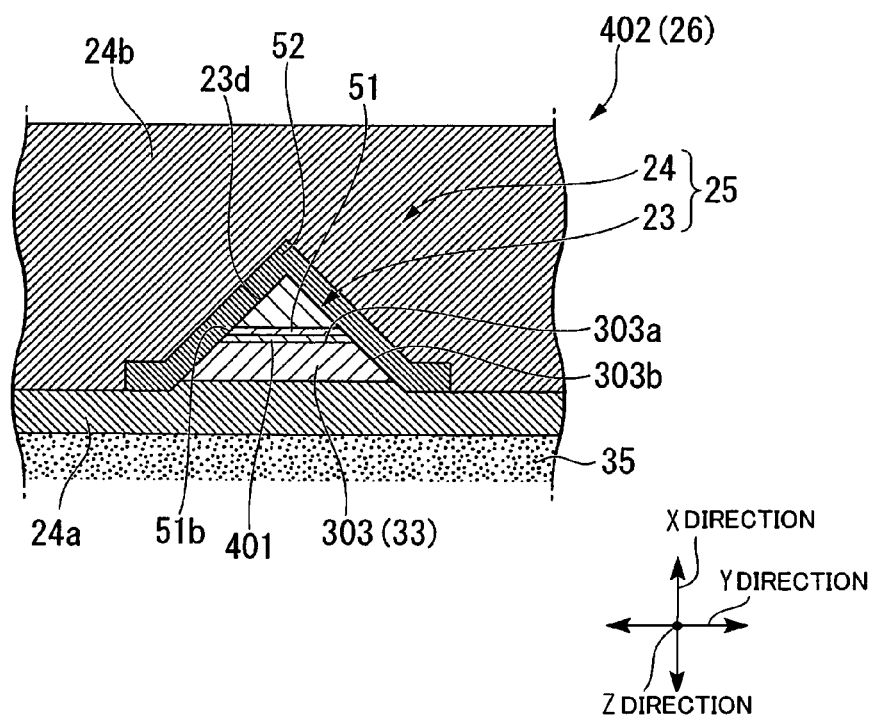
FIG. 15 is a diagram corresponding to FIG. 5 that shows a recording and playback head in a fourth embodiment.

Next, a fourth embodiment of the present invention will be described. FIG. 15 is a diagram that shows a recording and playback head in a fourth embodiment corresponding to FIG. 5.

As shown in FIG. 15, in a recording and playback head 402 of the present embodiment, a separation film 401 is formed which forms the image in the X direction between the metal film 51 and the tip portion 303 of the main magnetic pole 33. The separation film 401 is preferably constituted by an insulation material, and is formed of the same material as the core 23 mentioned above in the present embodiment. In addition, an external end surface of the separation film 401 is placed on the same surface of the side surface 23d of the core 23, the sloped surface 51b of the metal film 51, and the sloped surface 303b of the tip portion 303 of the main magnetic pole 33 when viewed from the Z direction.

According to the present embodiment, since the metal film 51 and the tip portion 303 of the main magnetic pole 33 can be electrically insulated and the alloying of the metal film 51 can be suppressed, the movement of the free electron in the metal film 51 is not adversely affected. For that reason, the generation efficiency of the near-field light R can be further improved.

In addition, the technical scope of the present invention is not limited to the respective embodiments mentioned above but include one in which various modifications are added to the embodiments mentioned above within the scope not departing from the gist of the present invention. That is, the configurations or the like described in the embodiments mentioned above are merely an example and can be suitably modified.

For example, in the embodiments mentioned above, the information recording and playback device of the air floating type was described as an example in which the recording and playback head is caused to float, but the disc and the recording and playback head may come into contact with each other if the recording and playback head is placed opposite to the disc surface, without being limited to this case. That is, the recording and playback head of the present invention may be a recording and playback head of a contact slider type. Even in this case, the same effect can be obtained.

Furthermore, in the embodiments mentioned above, a case was described where the near-field light generating element 26 is placed adjacent to the tip side of the slider 20 with respect to the recording element 21, but the order of the near-field light generating element 26, the recording element 21, and the playback element 22 can be suitably changed in design on the tip side of the slider 20, for example, by placing the recording element 21 adjacent to the tip side of the near-field light generating element 26, without being limited thereto.

Although a case was described as an example where the core 23 of the light flux propagation element 25 is gradually drawn from one end side to the other end side, the core 23 may be straightly formed without being limited thereto. Additionally, the light flux propagation element 25 was described as an example in which the core 23 and the cladding 24 are integrally formed of the materials different from each other, the light flux propagation element 25 may be formed in a hollow shape. In this case, a hollow air portion becomes the core, and a portion surrounding the same becomes the cladding. Even in the light flux propagation element configured in this manner, it is possible to propagate laser light L so as to be incident to the near-field light generating element 26.

Furthermore, in the embodiments mentioned above, a case was described as an example where the recording and playback head 2 of the present invention is adopted in a vertical magnetic recording type that gives the recording magnetic field perpendicular to the disc D, an in-plane recording type may be adopted which gives the recording magnetic field horizontal to the disc D without being limited thereto.

Furthermore, a method of forming the remaining portion 60 of the core 23 in the first patterning process mentioned above was described, but the core 23 other than the forming region of the core 23 may be completely removed without leaving the remaining portion 60.

Figure 16:
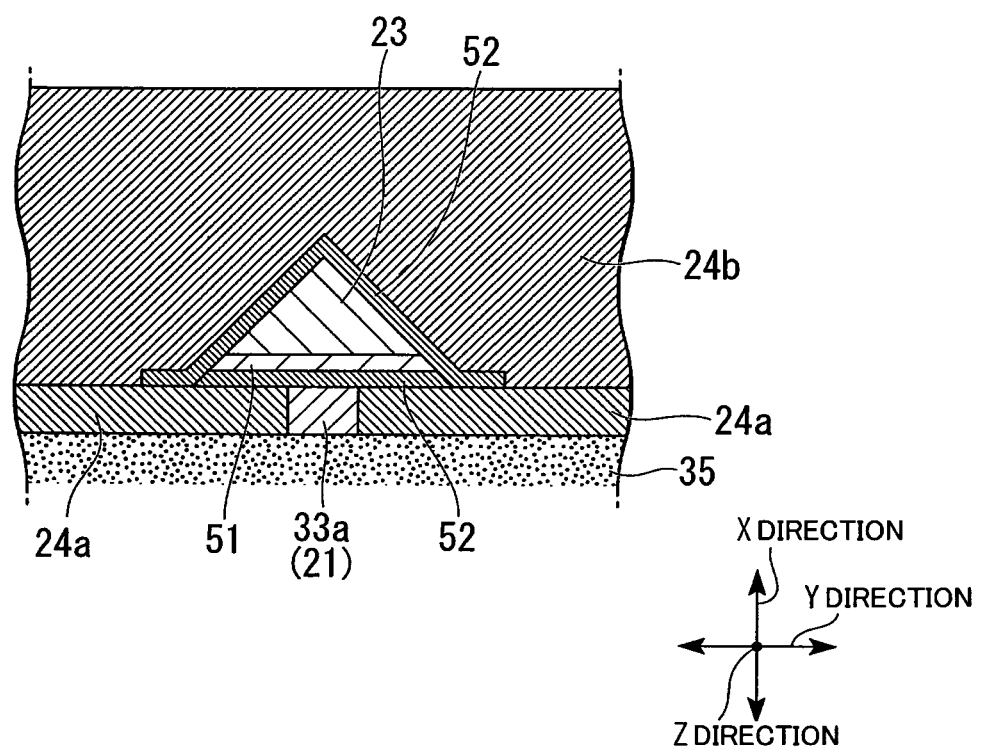
FIG. 16 is a diagram that shows another configuration of the recording and playback head corresponding to FIG. 5.

In addition, as shown in FIG. 16, the light shielding film (the first light shielding film) 52 may be formed between the metal film 51 and the first cladding 24a. That is, the light shielding film 52 may be formed over the whole periphery of the core 23. In this case, by reflecting laser light L transmitted through the metal film 51 and returning into the core 23 without causing the Plasmon resonance by the metal film 51, laser light can be incident to the metal film 51 again. As a result, the generation efficiency of the near-field light R can be further improved.

In addition, in order to form the near-field light generating element 26 shown in FIG. 16, the base material may be formed between the first cladding base material 124a and the metal film base material 151 in the film forming process mentioned above, and the base material of the light shielding film 52 may be collectively etched together with the core base material 123 and the metal film base material 151 in the second patterning process. As a result, the light shielding film 52 and the core 23 can be accurately positioned, whereby it is possible to fully return laser light L transmitted through the metal film 51 into the core 23.

Furthermore, the core 23 of the triangular shape when viewed from the Z direction was described, but the cross sectional shape of the core 23 when viewed from the Z direction may be suitably changed in design to a polygonal shape such as a trapezoidal shape or a pentagonal shape without being limited thereto.

Furthermore, a case was described where the sides surface 23g of the core 23 is a flat surface, but the side surface 23g of the core 23 may be a curved surface without being limited thereto. In any case, the side surface 51b of the metal film 51 or the side surface of the main magnetic pole 33 may be placed on the same surface of the adjacent side surface 23d on both sides of the side surface 23g of the core 23 in the Y direction via the corner portion.

What is claimed is:

1. A near-field light generating element which propagates light flux introduced to one end side thereof while focusing the light flux toward the other end side thereof, and which emits the light flux to the outside after near-filed light is generated from the light flux, the near-field light generating element comprising:
    a core that propagates the light flux toward the other end side; and
    a near-field light generating portion that generates the near-filed light from the light flux, the near-field light generating portion being placed along a propagation direction of the light flux facing from the one end side toward the other end side in the core to propagate the light flux along an interface between the near-field light generating portion and the core;
    wherein the core has a plurality of side surfaces extending along the propagation direction, the plurality of side surfaces including one side surface with the near-field light generating portion placed thereon and another side surface that is placed along a direction intersecting a plane direction of the one side surface on both sides of the one side surface when viewed from the propagation direction, and the near-field light generating portion has opposite end surfaces that are coplanar with the another side surface of the core.

2. A method of manufacturing a near-field light generating element which propagates light flux introduced to one end side thereof while focusing the light flux toward the other end side thereof, and which emits the light flux to the outside after near-field light is generated from the light flux, the element having a core that propagates the light flux toward the other end side, and having a near-field light generating portion that generates the near-field light from the light flux and that is placed along a propagation direction of the light flux facing from the one end side toward the other end side in the core to propagate the light flux along an interface between the near-field light generating portion and the core, the method comprising:
    a near-field light generating portion forming process of forming a base material of the near-field light generating portion;
    a core forming process of forming a base material of the core so as to cover the base material of the near-field light generating portion; and
    a patterning process of patterning the base material of the core and the base material of the near-field light generating portion to form the core and the near-field light generating portion;
    wherein, in the patterning process, the base material of the core and the base material of the near-field light generating portion are collectively patterned by the same process;
    wherein the patterning process has a first patterning process and a second patterning process;
    wherein in the first patterning process, the base material of the core in the forming region of the core is patterned so as to be a rectangular shape when viewed from the propagation direction;
    wherein in the second patterning process, the base material of the core is subjected to sputter etching in plasma, thereby patterning the base material of the core so as to become a triangular shape or a trapezoidal shape when viewed from the propagation direction; and wherein in the first patterning process, the base material of the core other than the forming region of the core remains in the state of being thinner than the base material of the core in the forming region of the core.

3. A method of manufacturing a near-field light generating element which propagates light flux introduced to one end side thereof while focusing the light flux toward the other end side thereof, and which emits the light flux to the outside after near-field light is generated from the light flux, the element having a core that propagates the light flux toward the other end side, and having a near-field light generating portion that generates the near-field light from the light flux and that is placed along a propagation direction of the light flux facing from the one end side toward the other end side in the core to propagate the light flux along an interface between the near-field light generating portion and the core, the method comprising:

a near-field light generating portion forming process of forming a base material of the near-field light generating portion;

a core forming process of forming a base material of the core so as to cover the base material of the near-field light generating portion; and a patterning process of patterning the base material of the core and the base material of the near-field light generating portion to form the core and the near-field light generating portion;

wherein, in the patterning process, the base material of the core and the base material of the near-field light generating portion are collectively patterned by the same process;

wherein the near-field light generating portion is formed of a metallic material; and wherein a process of removing the base material of the near-field light generating portion at least formed on the one end side is included between the near-field light generating portion forming process and the core forming process.

4. A method of manufacturing a near-field light head which heats a magnetic recording medium rotating in a given direction and which causes a magnetization reversal by applying a recording magnetic field to the magnetic recording medium to record information, the method comprising:

manufacturing a near-field light generating element which propagates light flux introduced to one end side thereof while focusing the light flux toward the other end side thereof, and which emits the light flux to the outside after near-field light is generated from the light flux, the element having a core that propagates the light flux toward the other end side, and having a near-field light generating portion that generates the near-field light from the light flux and that is placed along a propagation direction of the light flux facing from the one end side toward the other end side in the core to propagate the light flux along an interface between the near-field light generating portion and the core, the manufacture of the near-field light generating element comprising:

a near-field light generating portion forming process of forming a base material of the near-field light generating portion;

a core forming process of forming a base material of the core so as to cover the base material of the near-field light generating portion; and a patterning process of patterning the base material of the core and the base material of the near-field light generating portion to form the core and the near-field light generating portion;

wherein, in the patterning process, the base material of the core and the base material of the near-field light generating portion are collectively patterned by the same process; and a magnetic pole forming process of forming, before the near-field light generating portion forming process, a base material of a magnetic pole that generates a recording magnetic field;

wherein, in the patterning process, the base material of the magnetic pole is collectively patterned by the same process together with the base material of the core and the base material of the near-field light generating portion.

5. A near-field light head which heats a magnetic recording medium rotating in a given direction, and which causes a magnetization reversal by applying a recording magnetic field to the magnetic recording medium to record information, the near-field light head comprising:

a slider that is oppositely placed on a surface of the magnetic recording medium;

a recording element that is placed on a tip side of the slider, and that has a magnetic pole that generates the recording magnetic field;

the near-field light generating element according to claim 1, the near-field light generating element being fixed adjacent to the recording element in the state where the other end side faces the magnetic recording medium side; and light flux introduction means fixed to the slider for introducing the light flux from the one end side into the core.

6. The near-field light head according to claim 5, wherein the magnetic pole is oppositely placed on the one side surface of the core with the near-field light generating portion interposed therebetween, and the external end surface of the magnetic pole is placed on the same surface of the other side surface of the core when viewed from the propagation direction.

7. The near-field light head according to claim 5, wherein, between the near-field light generating portion and the magnetic pole, a separation film is formed which forms an image between the near-field light generating portion and the magnetic pole.

8. An information recording and playback device comprising:

the near-field light head according to 5;

a beam that is movable in a direction parallel to the surface of the magnetic recording medium and that supports the near-field light head on a tip side in the state of being rotatable around two axes which are parallel to the surface of the magnetic recording medium and are perpendicular to each other;

a light source that causes the light flux to be incident to the light flux introduction means;

an actuator that supports a proximal end side of the beam and moves the beam toward a direction parallel to the surface of the magnetic recording medium;

a rotation driving portion that rotates the magnetic recording medium in the given direction; and a control portion that controls the operation of the recording element and the light source.

9. A method of manufacturing a near-field light generating element which propagates light flux introduced to one end side thereof while focusing the light flux toward the other end side thereof, and which emits the light flux to the outside after near-field light is generated from the light flux, the element having a core that propagates the light flux toward the other end side, and having a near-field light generating portion that generates the near-field light from the light flux and that is placed along a propagation direction of the light flux facing from the one end side toward the other end side in the core to propagate the light flux along an interface between the near-field light generating portion and the core, the method comprising:
- a near-field light generating portion forming process of forming a base material of the near-field light generating portion;
- a core forming process of forming a base material of the core so as to cover the base material of the near-field light generating portion; and
- a patterning process of patterning the base material of the core and the base material of the near-field light generating portion to form the core and the near-field light generating portion;

wherein, in the patterning process, the base material of the core and the base material of the near-field light generating portion are collectively patterned by the same process; and wherein in the patterning process, the core is formed with a plurality of side surfaces extending along the propagation direction, the plurality of side surfaces including one side surface with the near-field light generating element placed thereon and another side surface that is placed along a direction intersecting a plane direction of the one side surface on both sides of the one side surface when viewed from the propagation direction.

10. The method according to claim 9, wherein in the patterning process, both end surfaces of the near-field light generating portion are placed on the same surface of the other side surface of the core when viewed from the propagation direction.

* * * * *